United States Patent
Kwon

(10) Patent No.: US 10,924,904 B2
(45) Date of Patent: Feb. 16, 2021

(54) METHOD AND APPARATUS FOR PERFORMING OBJECT TRANSFER SERVICE BY USING BLUETOOTH COMMUNICATION IN WIRELESS COMMUNICATION SYSTEM

(71) Applicant: LG ELECTRONICS INC., Seoul (KR)

(72) Inventor: Younghwan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 293 days.

(21) Appl. No.: 15/532,382

(22) PCT Filed: Jun. 26, 2015

(86) PCT No.: PCT/KR2015/006557
§ 371 (c)(1),
(2) Date: Jun. 1, 2017

(87) PCT Pub. No.: WO2016/088964
PCT Pub. Date: Jun. 9, 2016

(65) Prior Publication Data
US 2017/0339514 A1    Nov. 23, 2017

Related U.S. Application Data

(60) Provisional application No. 62/086,665, filed on Dec. 2, 2014.

(51) Int. Cl.
*H04W 4/80*      (2018.01)
*H04W 76/10*     (2018.01)
(Continued)

(52) U.S. Cl.
CPC .............. *H04W 4/80* (2018.02); *H04L 63/06* (2013.01); *H04L 63/083* (2013.01);
(Continued)

(58) Field of Classification Search
CPC ....... H04W 4/80; H04W 8/005; H04W 76/14; H04W 76/10; H04W 12/08; H04W 92/18;
(Continued)

(56) References Cited

U.S. PATENT DOCUMENTS

2006/0190427 A1\*   8/2006   Peters .................. H04L 67/104
2012/0052802 A1\*   3/2012   Kasslin ................ H04W 48/12
                                                   455/41.2
(Continued)

FOREIGN PATENT DOCUMENTS

KR    10-2006-0043620 A    5/2006
KR    10-2010-0114407 A   10/2010
WO    WO 2014/082665 A1    6/2014

*Primary Examiner* — Lester G Kincaid
*Assistant Examiner* — Maryam Soltanzadeh
(74) *Attorney, Agent, or Firm* — Birch, Stewart, Kolasch & Birch, LLP

(57) ABSTRACT

Disclosed is a method for performing communication using Bluetooth in a wireless communication system. The method includes sending an advertising message providing notification of the provision of an object transfer service to a first client device, receiving a scan request message for requesting additional information from the first client device, sending a scan response message to the first client device in response to the scan request, receiving a connection request message for Bluetooth connection from the first client device, selecting a specific object as a current object, and receiving control information indicating whether the execution of a specific operation in the selected current object is permitted from the first client device.

16 Claims, 20 Drawing Sheets

(51) Int. Cl.
    *H04W 92/18*    (2009.01)
    *H04L 29/06*    (2006.01)
    *H04W 12/08*    (2009.01)
    *H04W 12/06*    (2009.01)
    *H04W 12/00*    (2009.01)
    *H04W 76/14*    (2018.01)
    *H04W 8/00*    (2009.01)
    *H04W 84/18*    (2009.01)

(52) U.S. Cl.
    CPC ......... *H04W 8/005* (2013.01); *H04W 12/003* (2019.01); *H04W 12/06* (2013.01); *H04W 12/08* (2013.01); *H04W 76/10* (2018.02); *H04W 76/14* (2018.02); *H04W 92/18* (2013.01); *H04W 84/18* (2013.01)

(58) Field of Classification Search
    CPC ...... H04W 12/06; H04W 84/18; H04L 63/06; H04L 63/083
    See application file for complete search history.

(56) References Cited

U.S. PATENT DOCUMENTS

| | | | |
|---|---|---|---|
| 2012/0052808 A1* | 3/2012 | McMeans | H04M 1/57 455/41.3 |
| 2013/0247142 A1* | 9/2013 | Nishizawa | G06F 21/604 726/1 |
| 2013/0288604 A1 | 10/2013 | Chang et al. | |
| 2015/0032547 A1* | 1/2015 | Malhotra | H04H 60/63 705/14.64 |

* cited by examiner

【Figure 1】
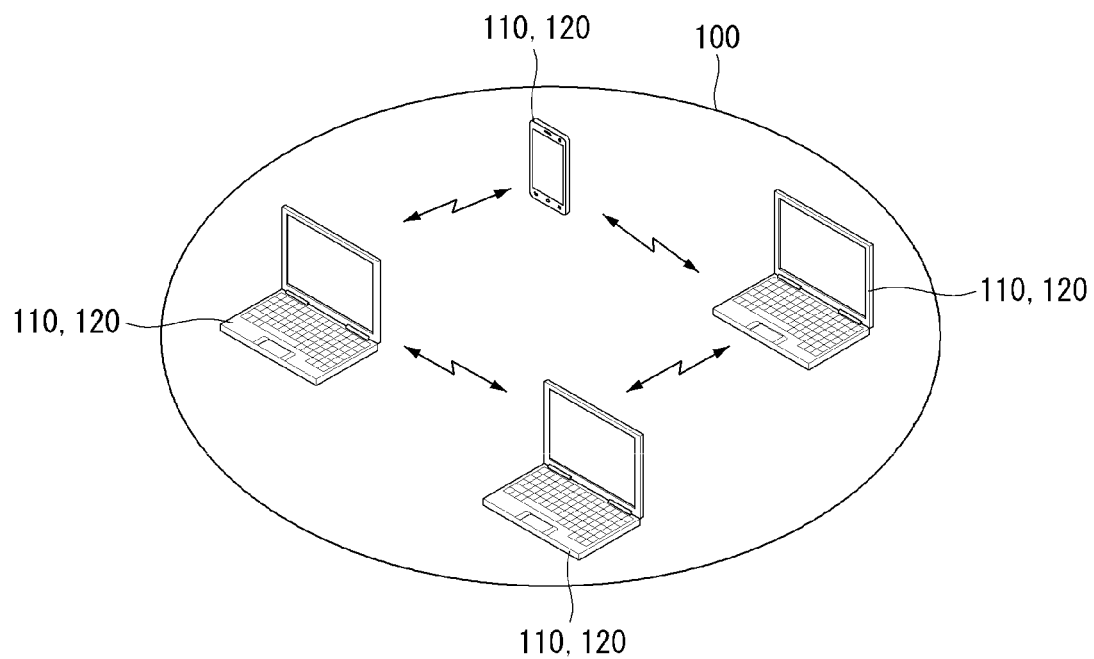

[Figure 2]
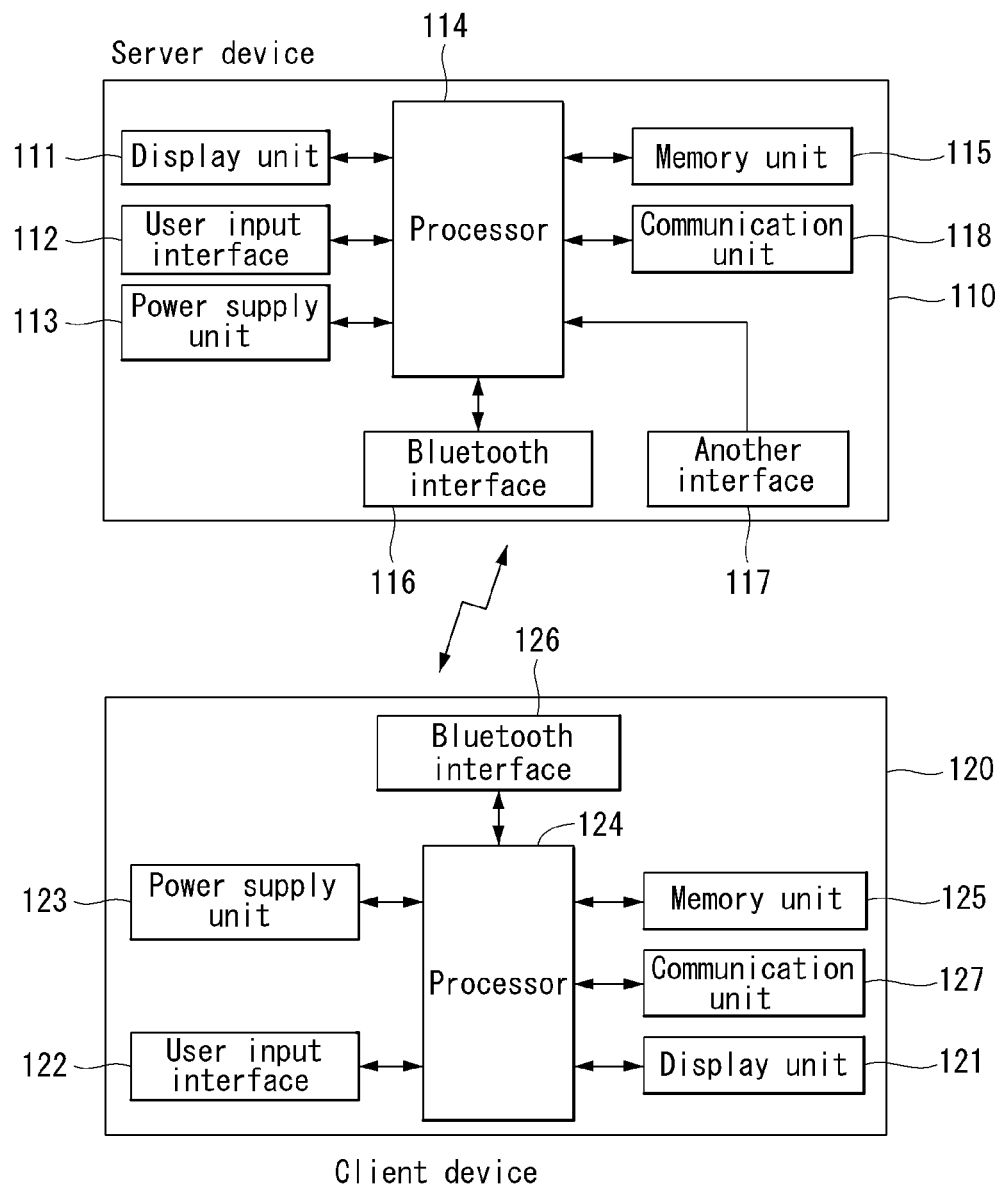

[Figure 3]
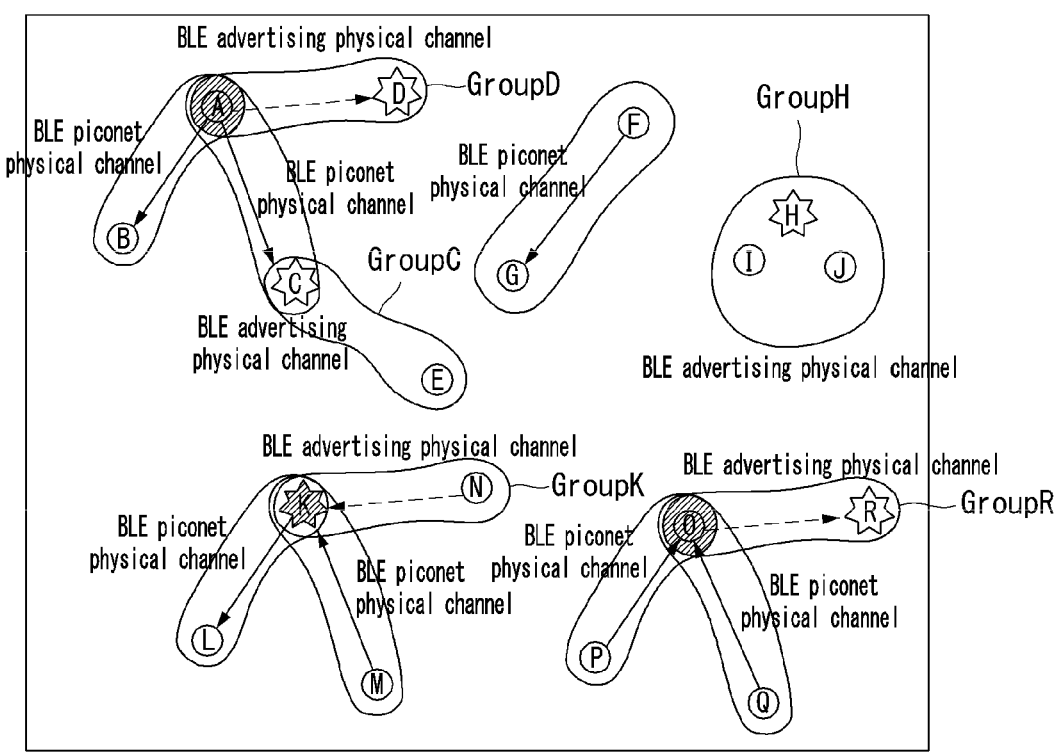

[Figure 4]
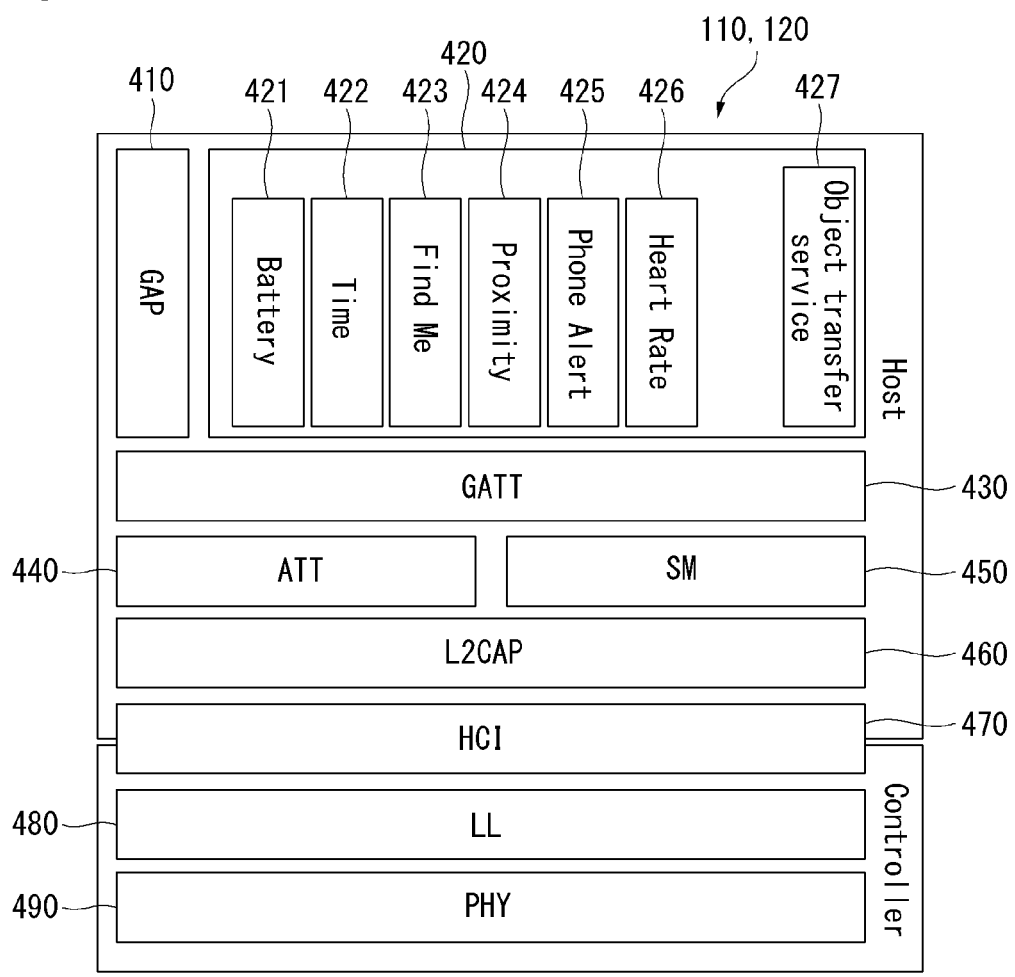

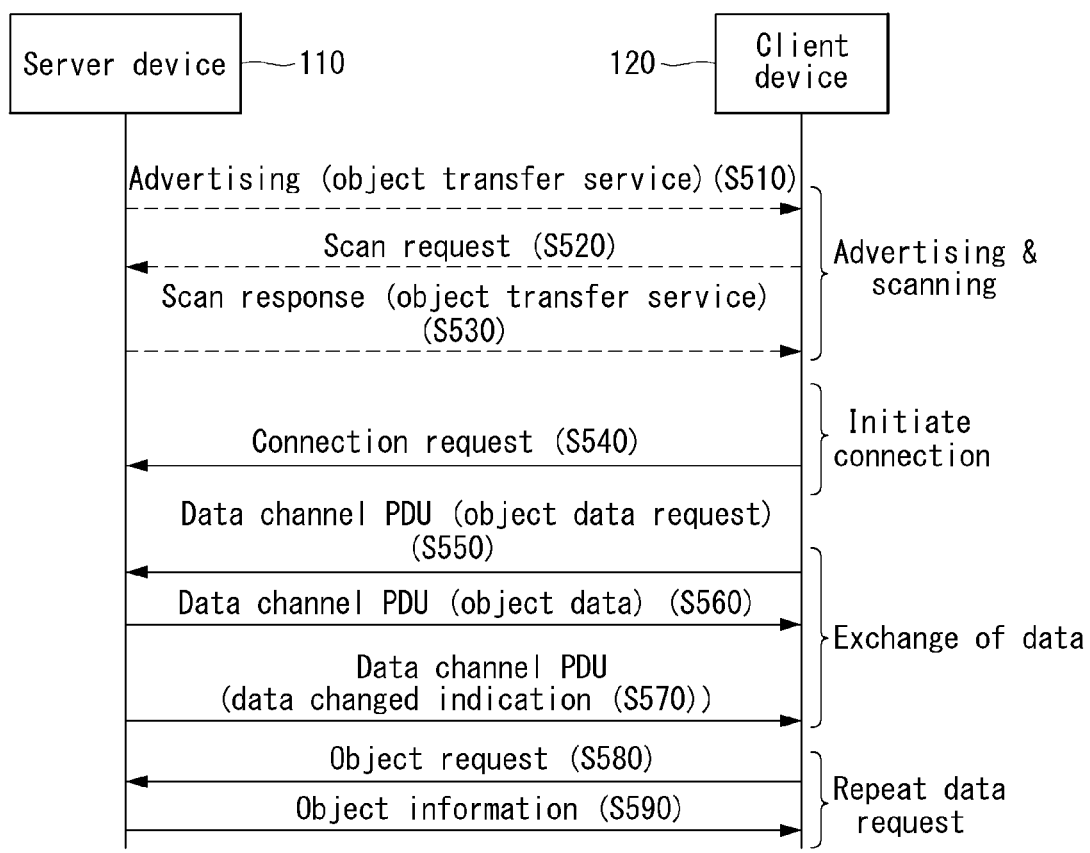
[Figure 5]

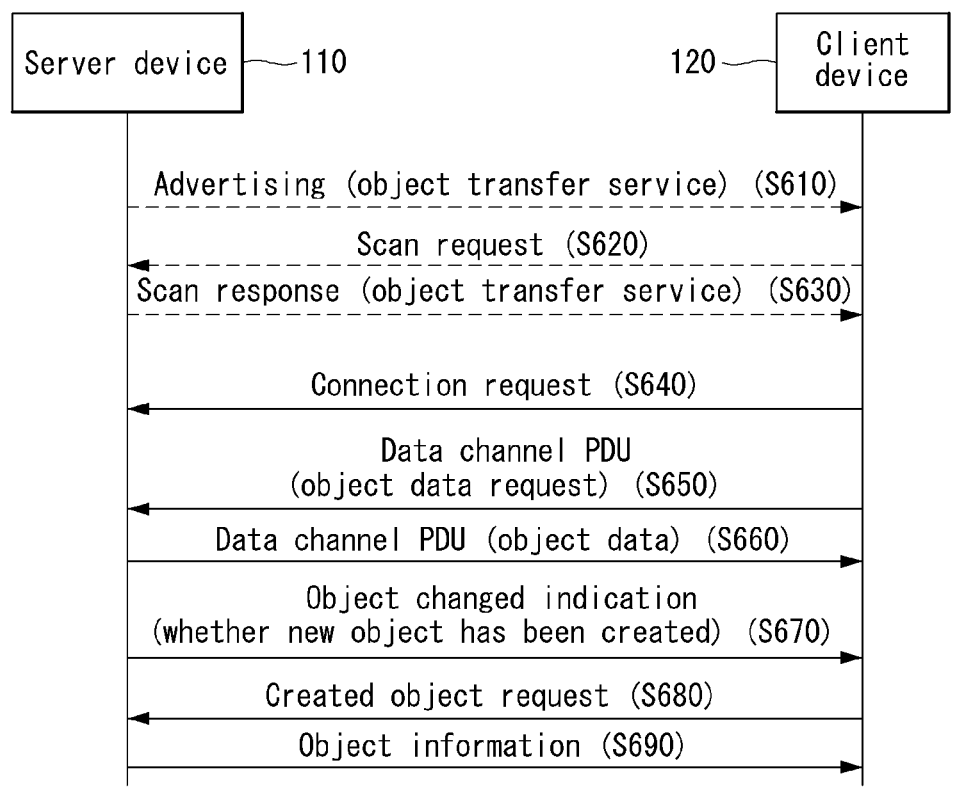
[Figure 6]

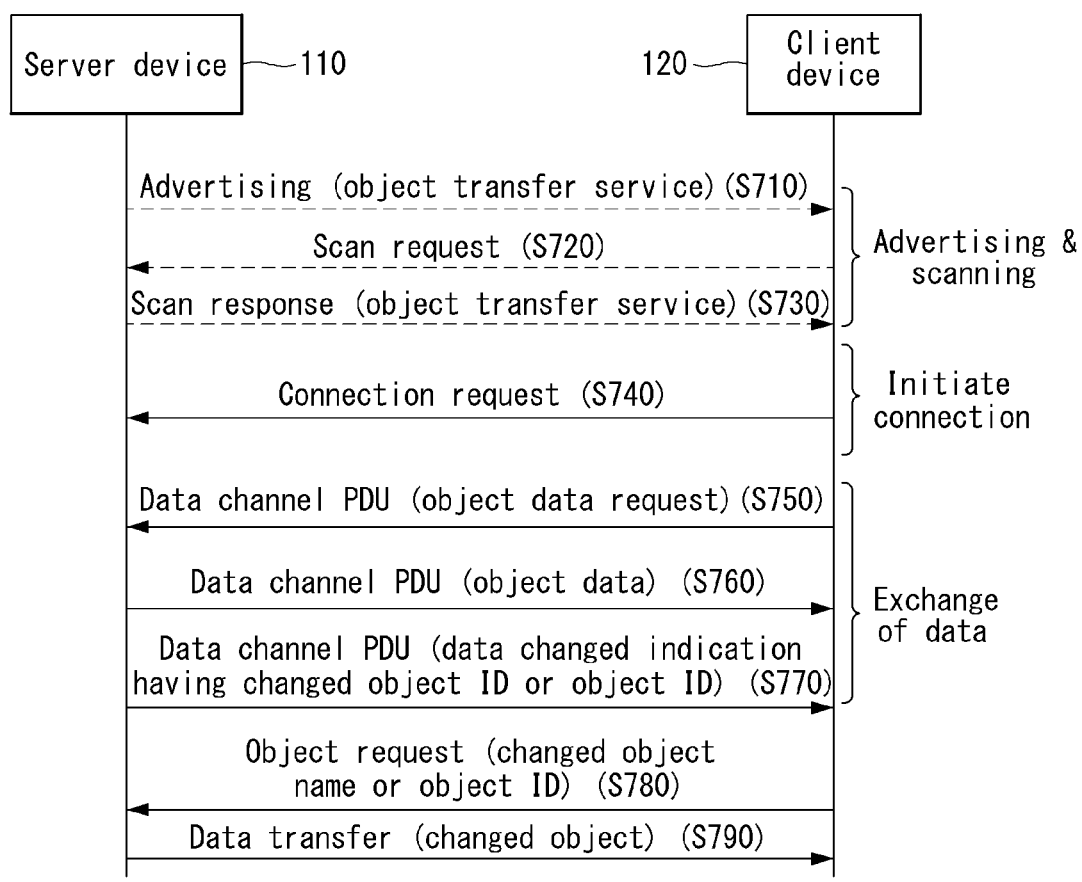
[Figure 7]

[Figure 8]
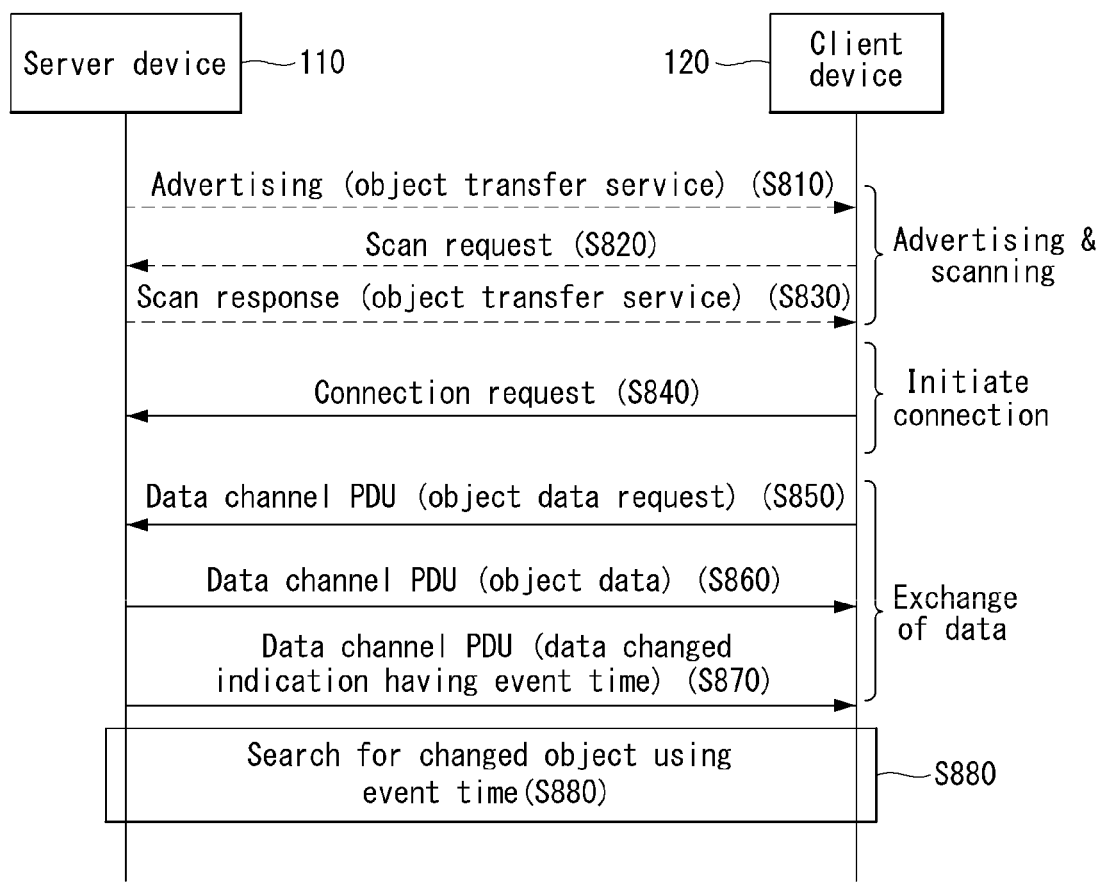

[Figure 9]
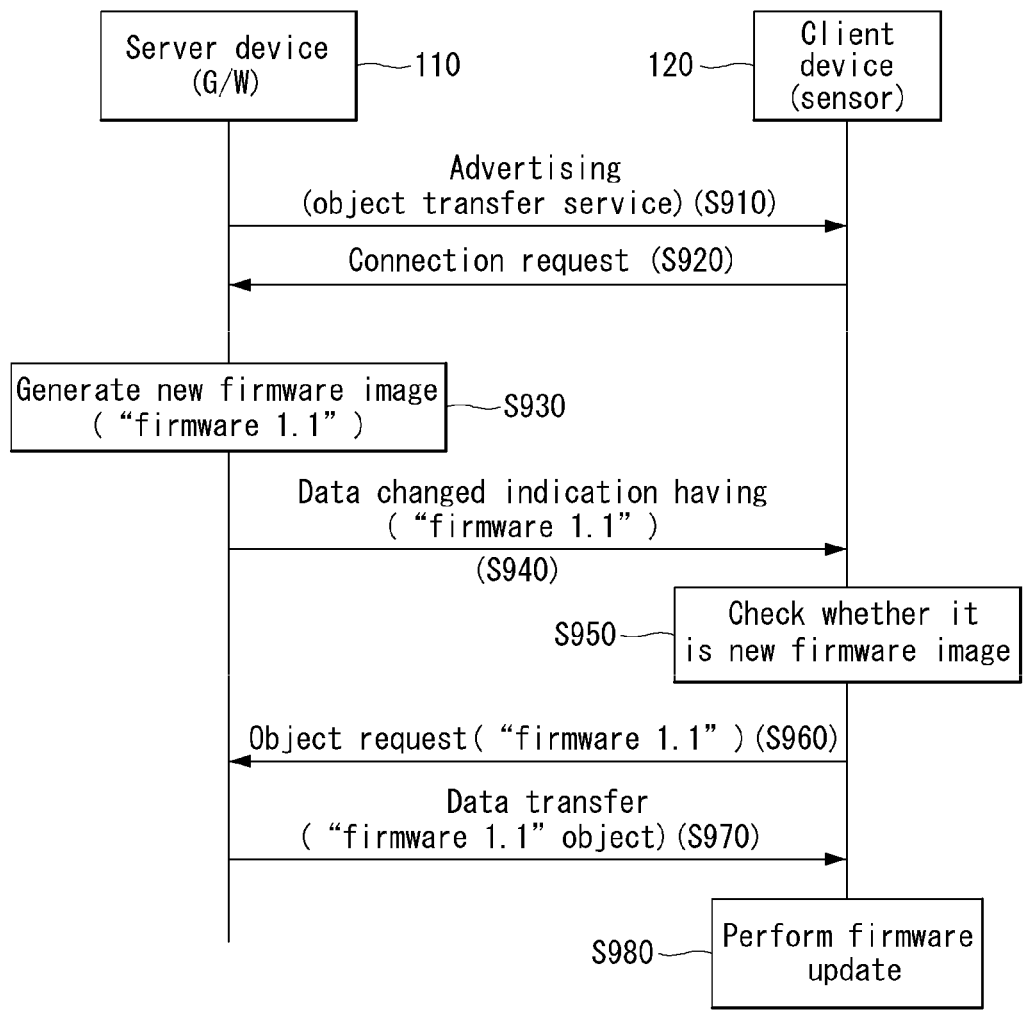

[Figure 10]
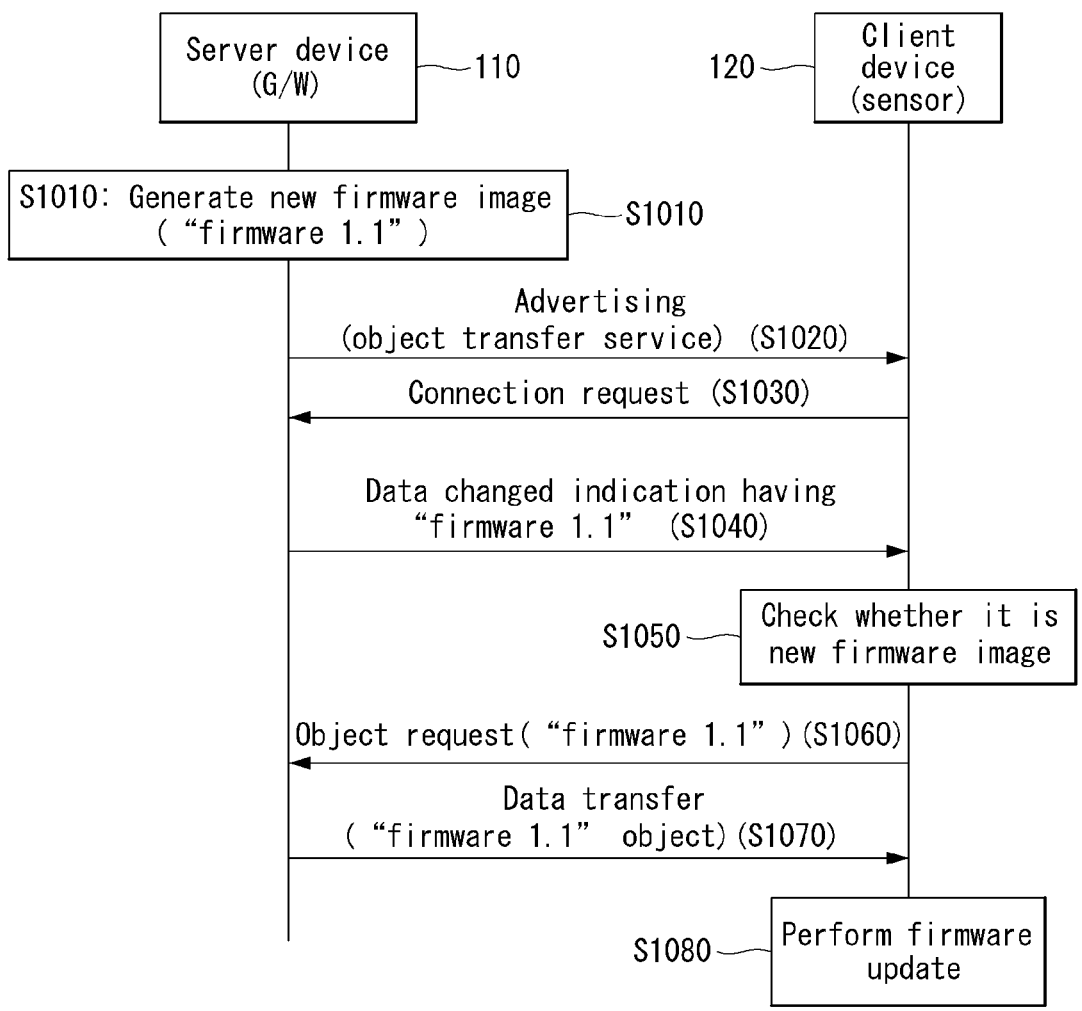

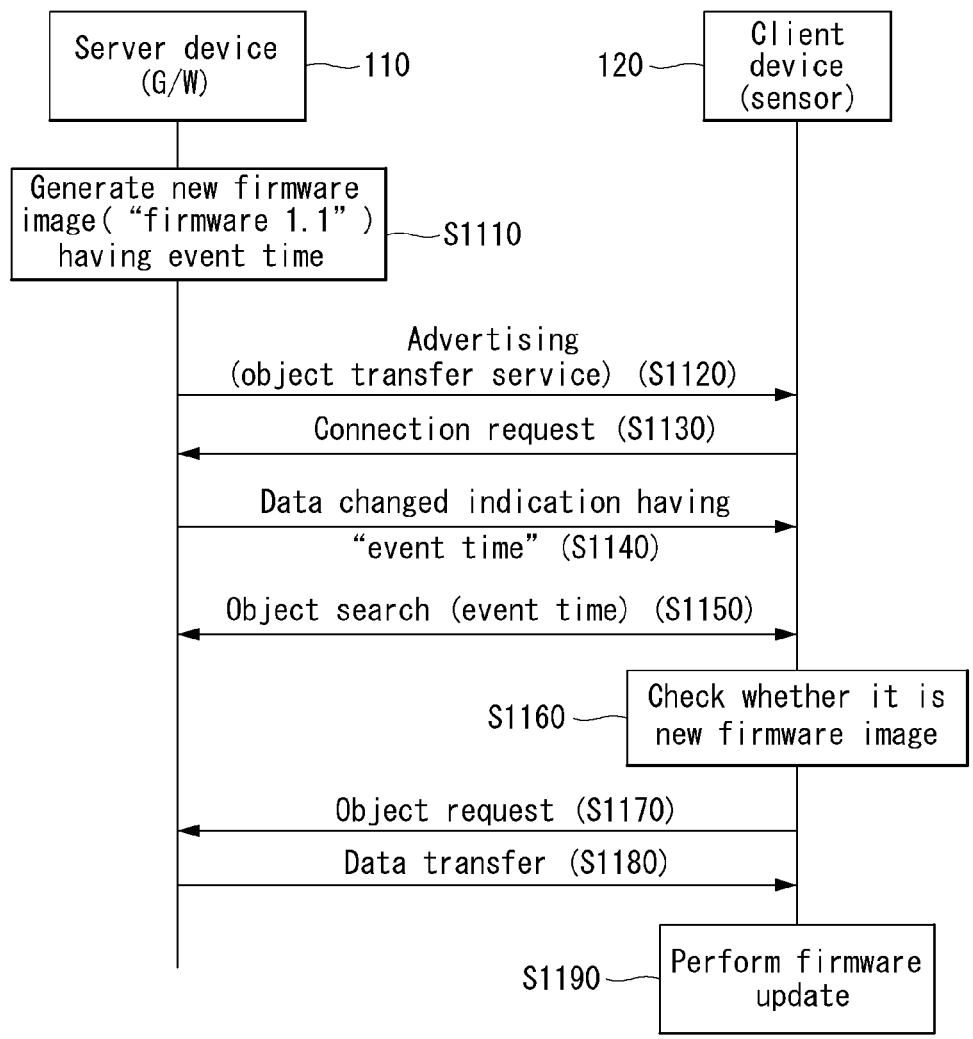
[Figure 11]

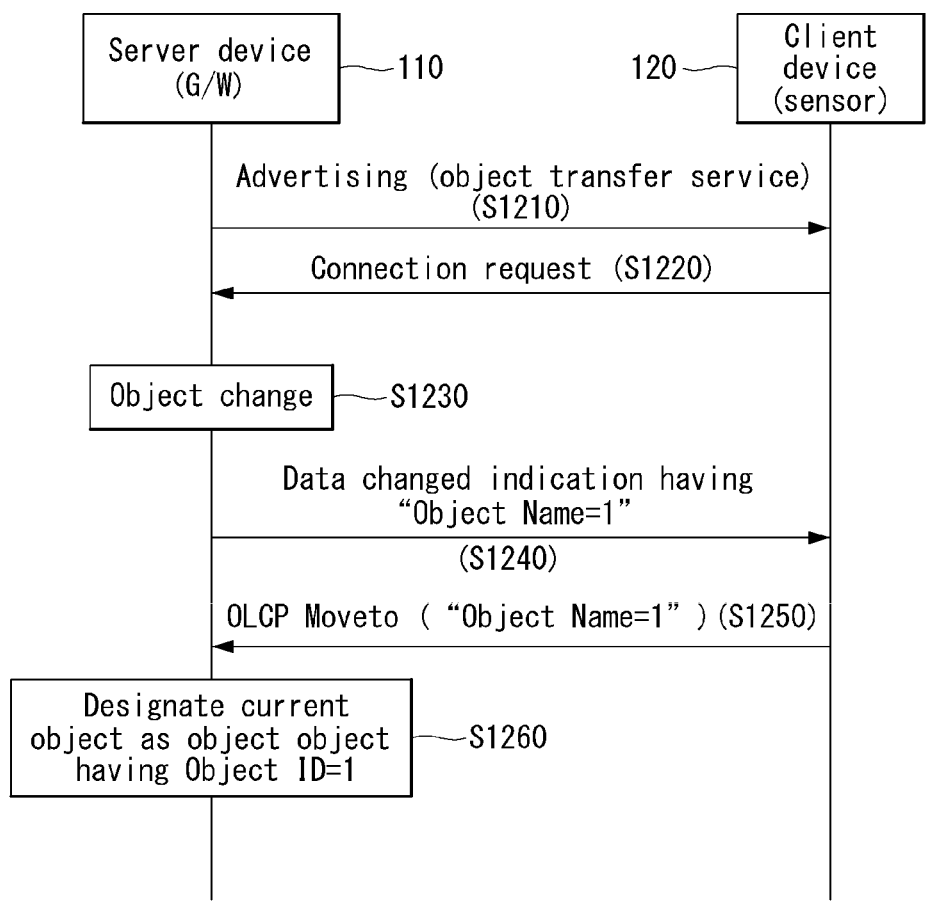
[Figure 12]

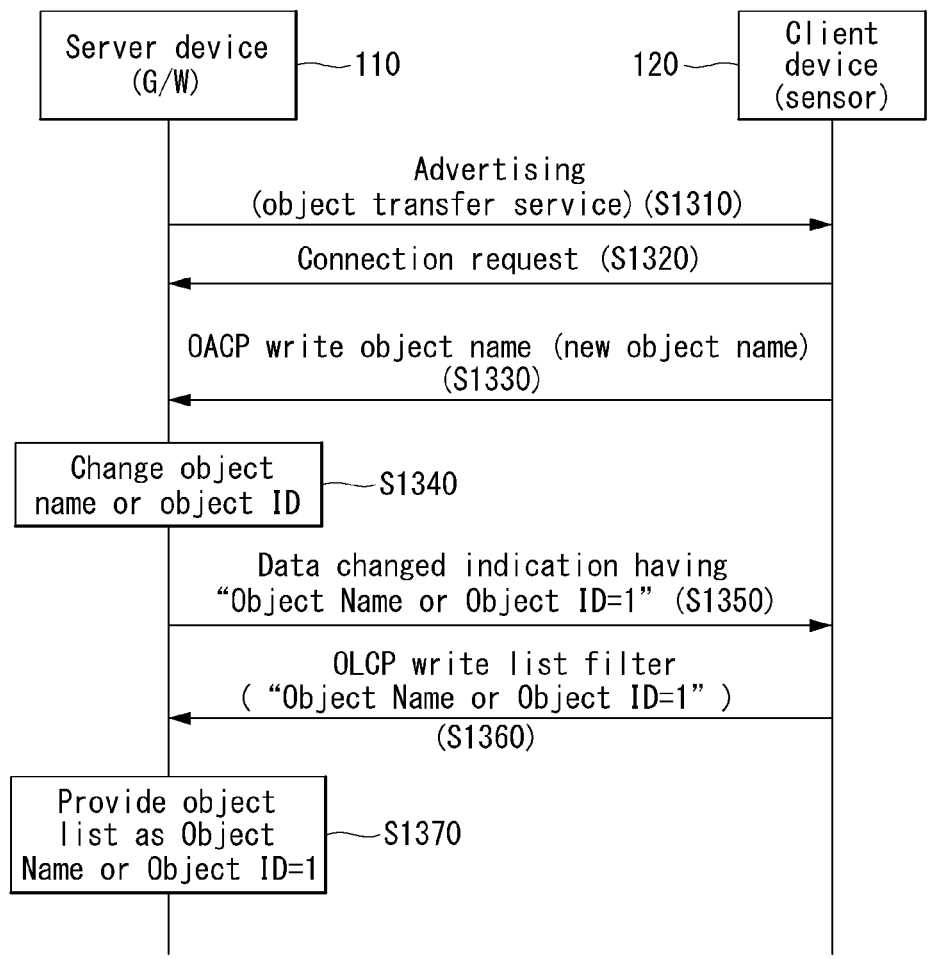
[Figure 13]

[Figure 14a]
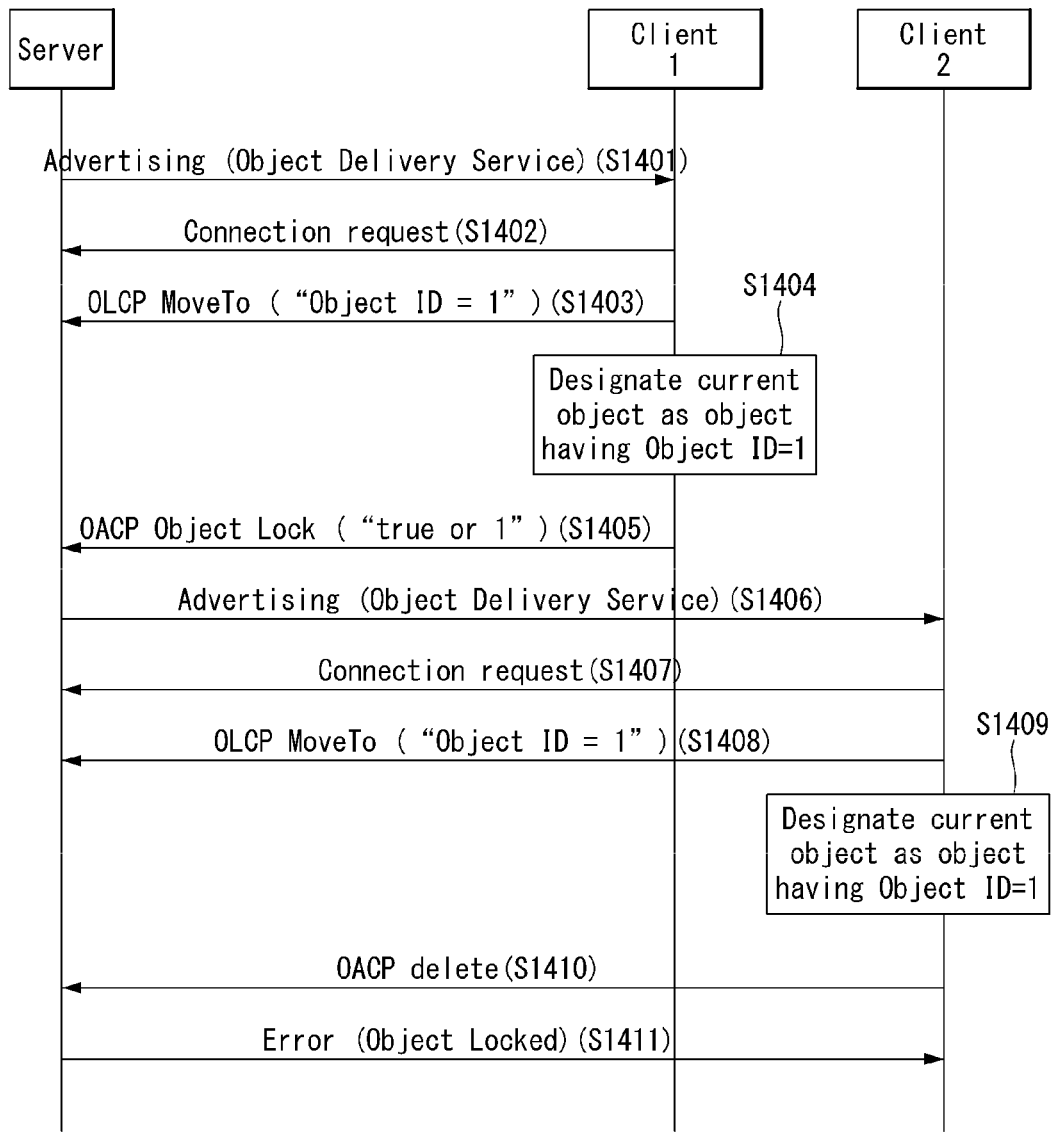

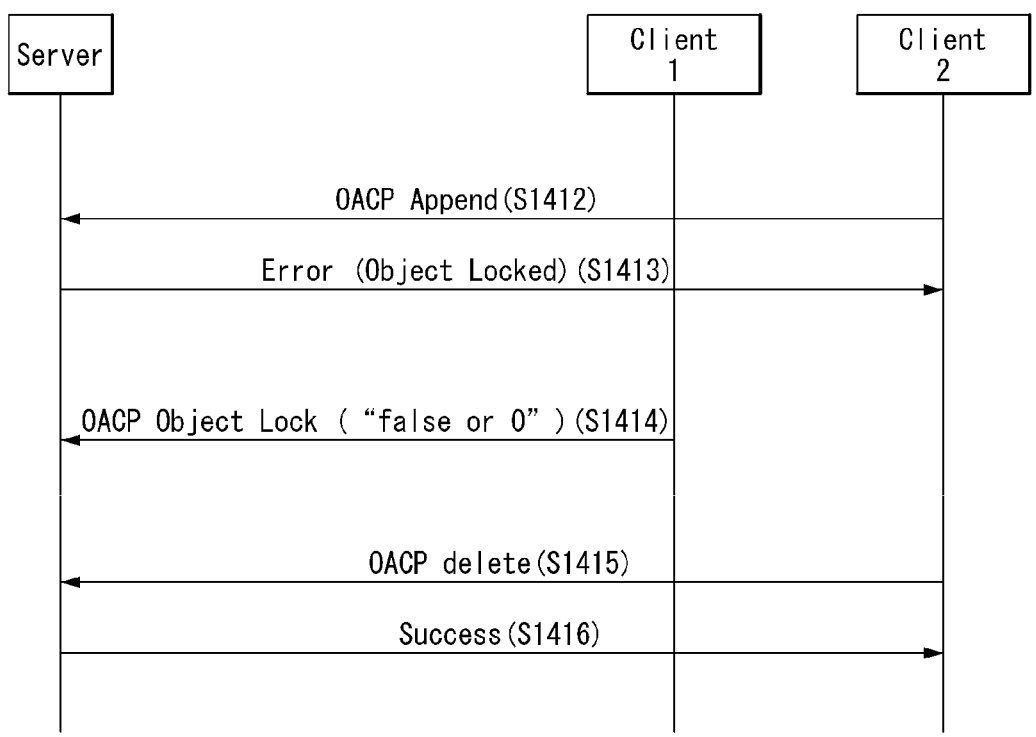

[Figure 15]
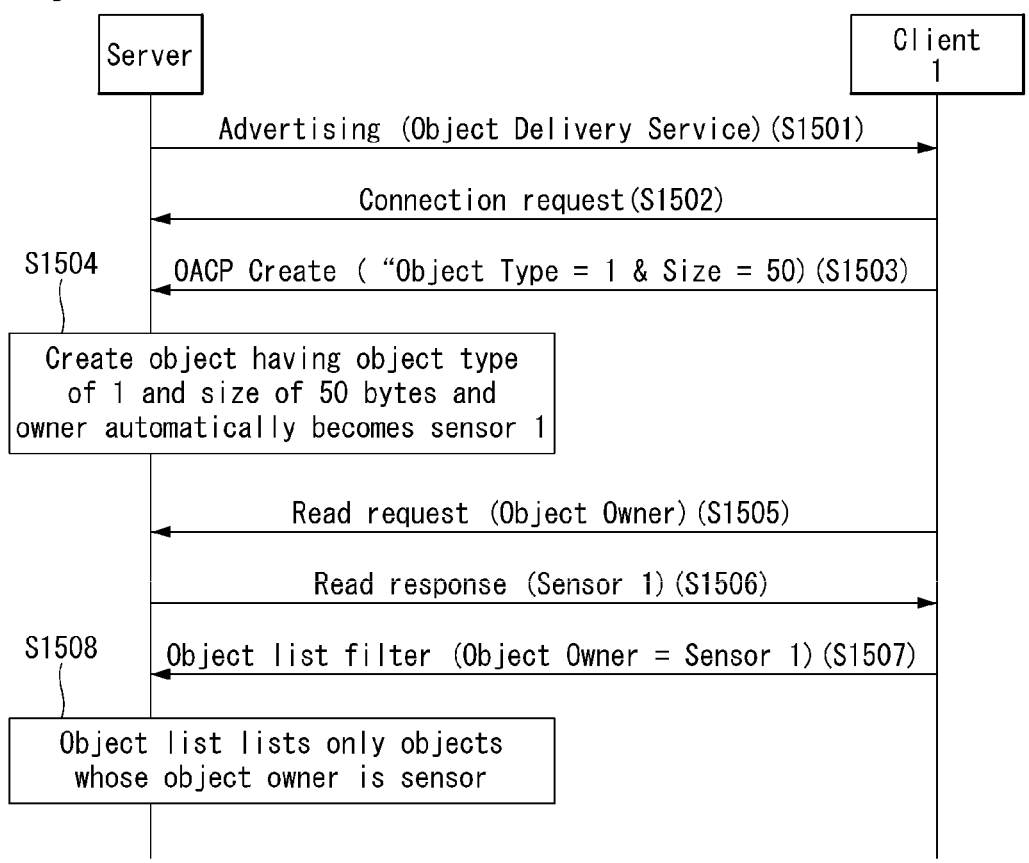

[Figure 16]
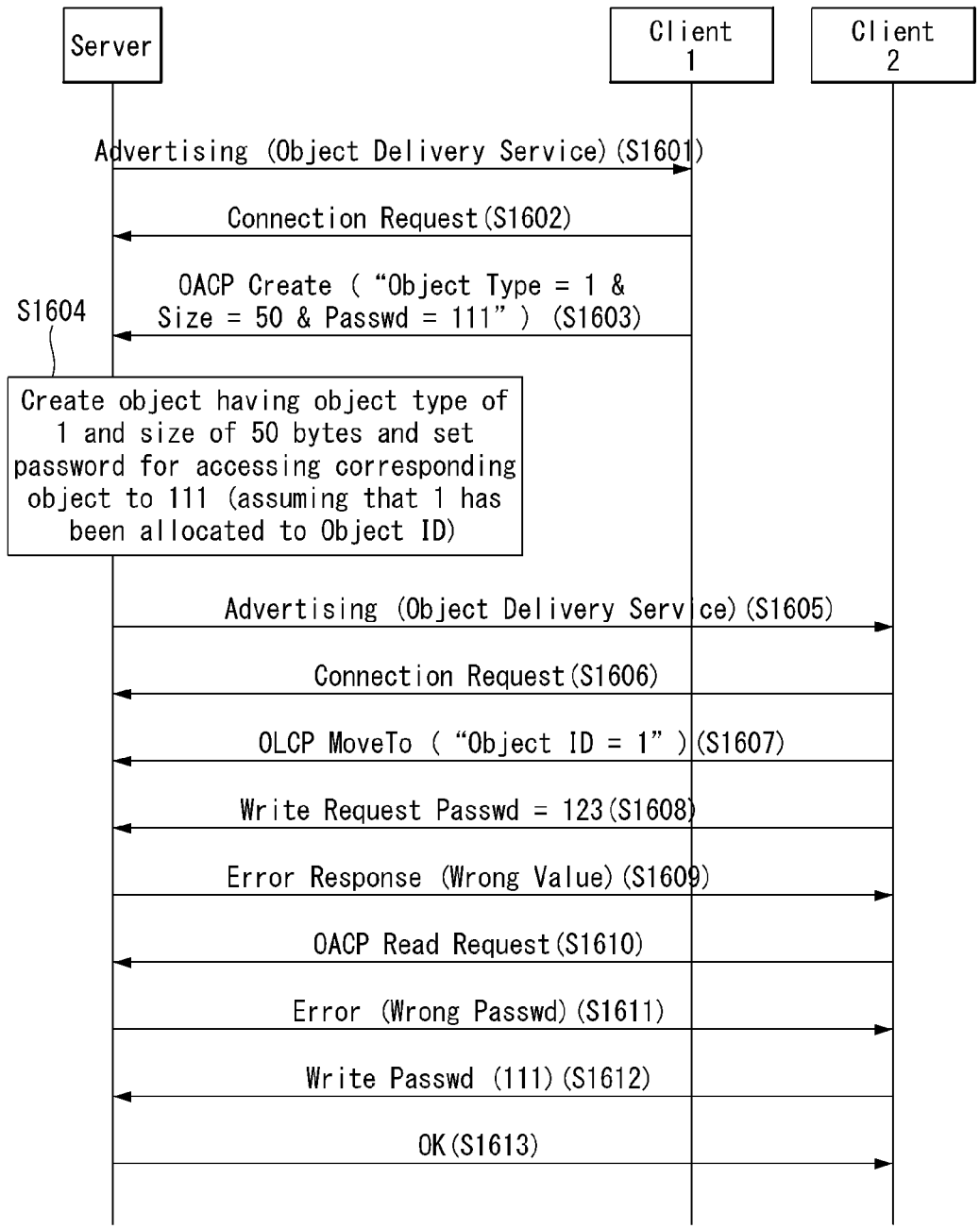

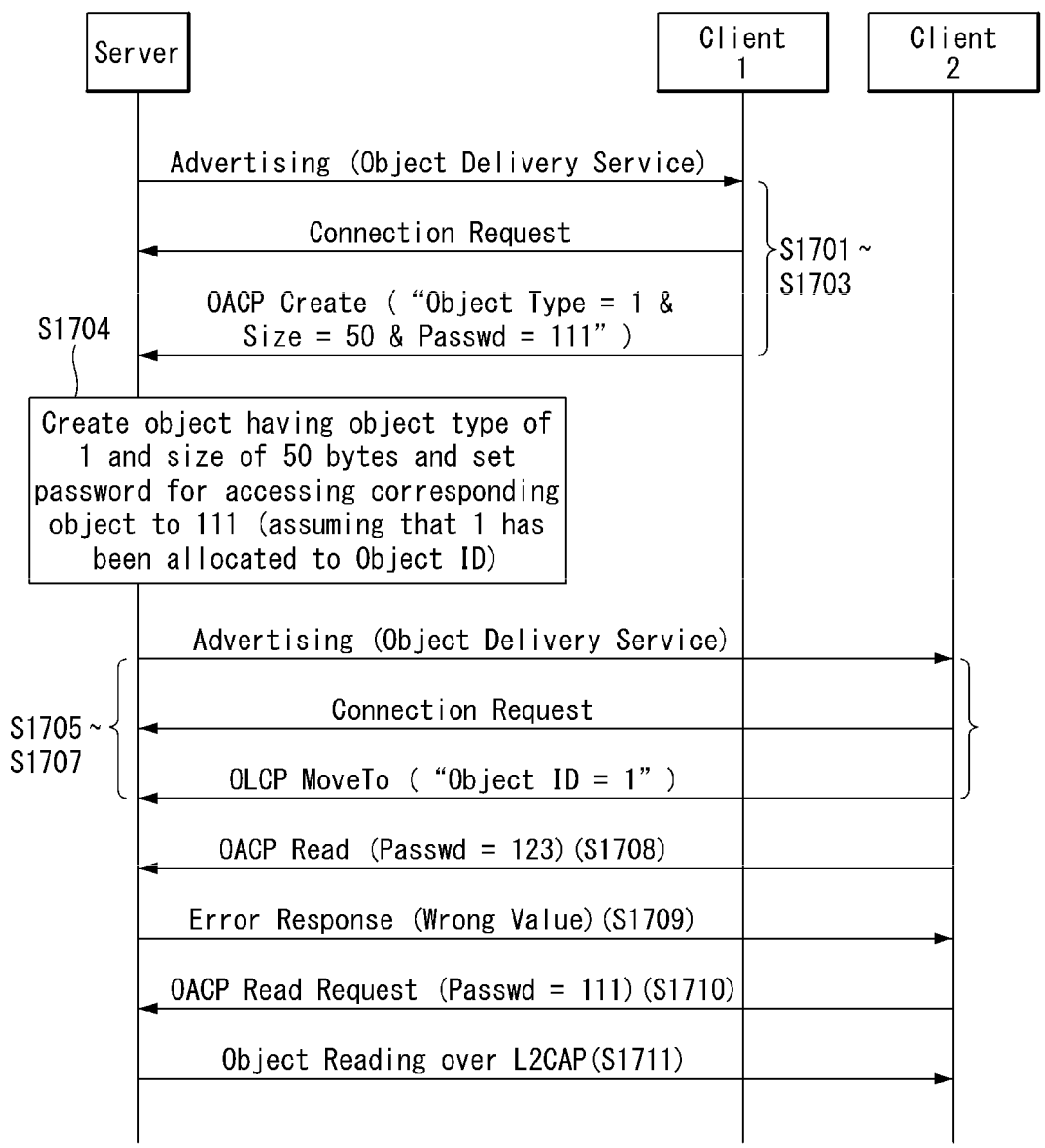
[Figure 17]

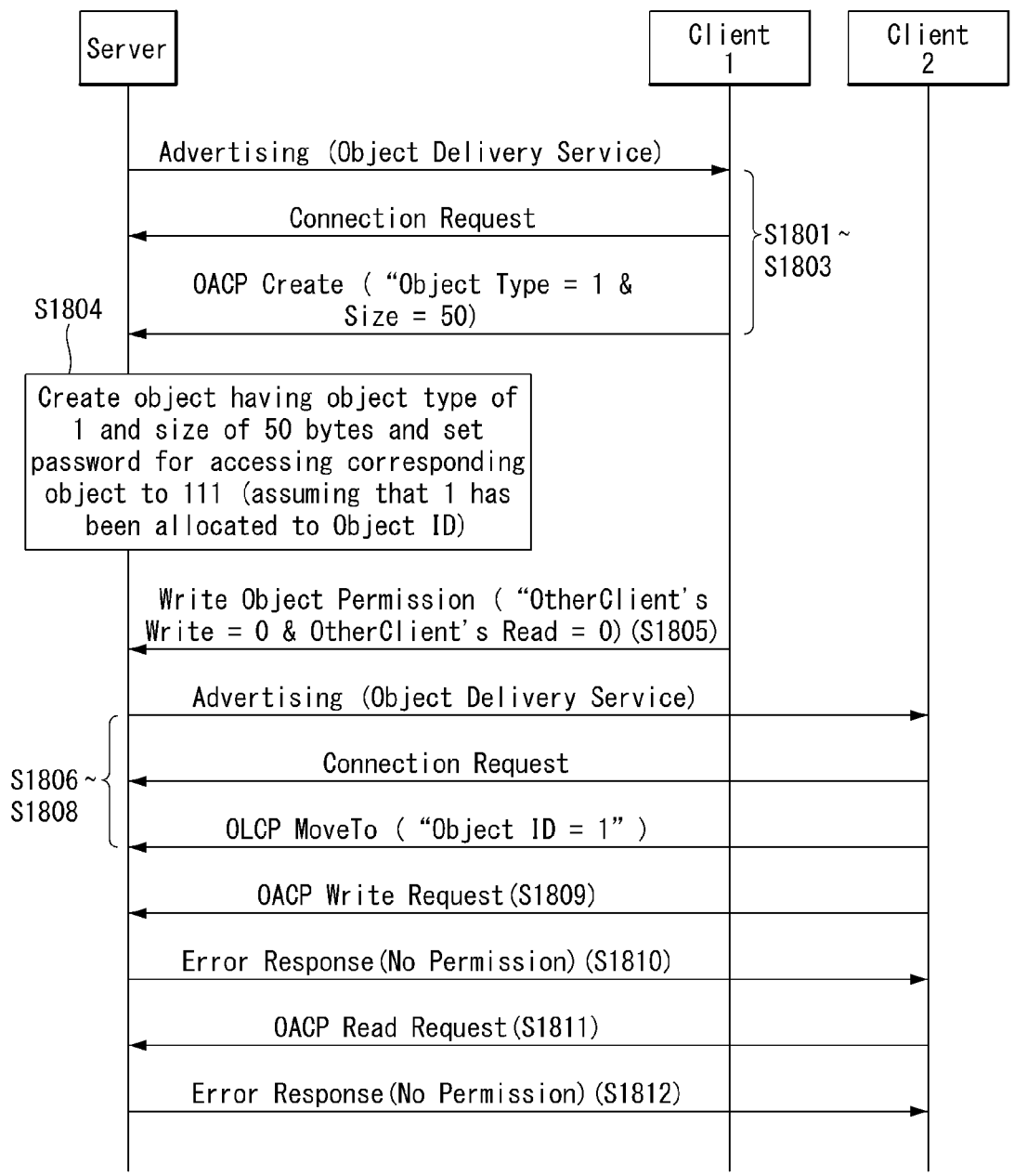
[Figure 18]

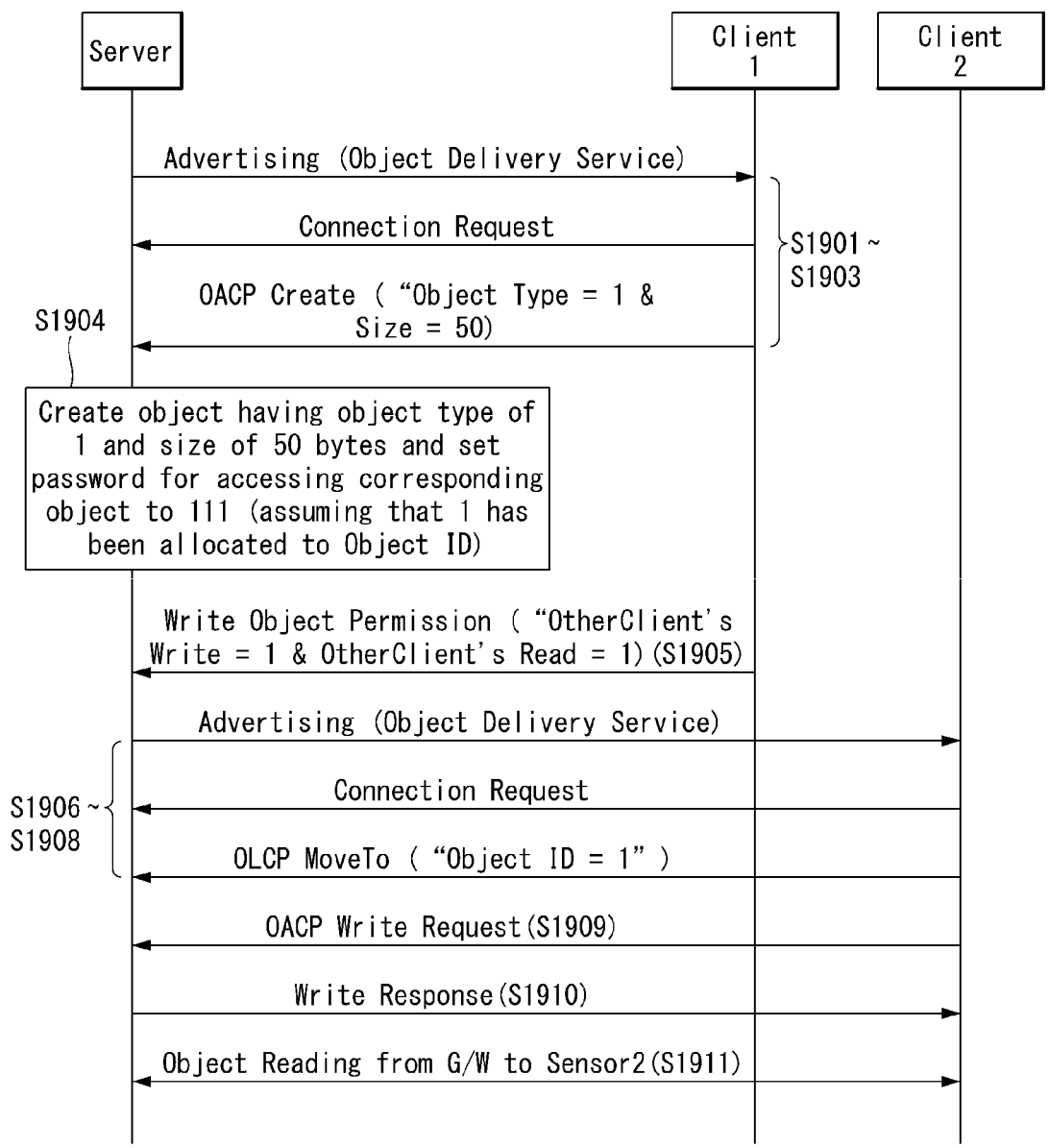
[Figure 19]

METHOD AND APPARATUS FOR PERFORMING OBJECT TRANSFER SERVICE BY USING BLUETOOTH COMMUNICATION IN WIRELESS COMMUNICATION SYSTEM

CROSS REFERENCE TO RELATED APPLICATIONS

This application is the National Phase of PCT International Application No. PCT/KR2015/006557, filed on Jun. 26, 2015, which claims priority under 35 U.S.C. 119(e) to U.S. Provisional Application No. 62/086,665, filed on Dec. 2, 2014, all of which are hereby expressly incorporated by reference into the present application.

TECHNICAL FIELD

This specification relates to a method of transmitting data or object-related data using Bluetooth communication.

BACKGROUND ART

Bluetooth is one of representative short-distance wireless technologies in which various devices (e.g., a smart phone, a PC, an earphone, and a headphone) are interconnected to exchange information. Furthermore, Bluetooth is a technology applied to most of smart phones, PCs, and notebooks, which allows many people to easily use Bluetooth. The pairing procedure of Bluetooth stably provides connectivity between devices. A recent LE technology can stably provide information of several hundreds of KB while consuming low power.

If such a Bluetooth LE (BLE) technology is used, data can be rapidly transferred while using low power. The transfer of characteristic data in BLE has a limit that a maximum length is 512 bytes, and thus requires an object (file)-based transfer method in order to overcome the limit. In the object-based transfer method, a server may manage object type data using metadata, and a client may send or receive the data to or from the server. Furthermore, when the data managed by the server is changed, another device (or device) needs to be notified of such a change. In particular, if there is several data, another device (or device) needs to be clearly notified of the several data. However, such a method is not clear in the current BLE technology.

Accordingly, there is an additional need for a task for clearly providing notification of whether object-related data or the metadata of the data has been modified and searching for changed object-related data or the metadata of the data.

DISCLOSURE

Technical Problem

An object of this specification is to provide a method for controlling the transfer of object type (file type) data having a size of 512 bytes or more by providing an object transfer service in the BLE technology.

Furthermore, this specification is directed to the provision of a method for managing an object or data between devices by transmitting information indicative of a created object or data when the new object or data is created.

Furthermore, this specification is directed to the provision of a method for managing an object or data between devices by transmitting information to identify a changed object or data when the object or data is changed.

Furthermore, this specification is directed to the provision of a method for managing an object or data between devices by transmitting the event time of a changed object or data when the object or data is changed.

Furthermore, this specification is directed to the provision of a method for performing object list filtering using an object ID.

Furthermore, this specification is directed to the provision of a method for designating a current object through a movement from an object list control point (OLCP) to a specific object in an object list.

Furthermore, this specification is directed to the provision of a method for changing the marking value of an object.

Furthermore, an object of this specification is to provide a method for locking a specific object and releasing the lock of a specific object in an object transfer service.

Furthermore, an object of this specification is to provide a method for providing the Object Owner value of a specific object in an object transfer service.

Furthermore, an object of this specification is to provide a method for setting the password of a specific object and permitting the rights of a specific object in an object transfer service.

Technical Solution

A method for performing communication using Bluetooth in a wireless communication system includes transmitting an advertising message informing the provision of an object transfer service to a first client device, receiving a scan request message for requesting additional information from the first client device, transmitting a scan response message to the first client device in response to the scan request, receiving a connection request message for Bluetooth connection from the first client device, selecting a specific object as a current object, and receiving a control information indicating whether the execution of a specific operation in the selected current object is permitted from the first client device.

Furthermore, in this specification, the execution of the specific operation includes at least one of reading the object, writing data in the object, deleting the object or appending data to the object.

Furthermore, in this specification, the step of selecting the current object includes receiving an object list control point (OLCP) information including an Op code instructing movement to an object having a specific object identifier from the first client device.

In this specification, the method further includes transmitting an advertising message informing the provision of an object transfer service to a second client device, receiving a connection request message for Bluetooth connection from the second client device, and receiving an object list control point (OLCP) information including an Op code instructing movement of an object to the selected current object from the second client device.

In this specification, the method further includes receiving an object action control point (OACP) information including an Op code instructing the execution of a specific operation in the selected current object from the second client device and transmitting a response indicative of the denial or permission of the received OACP information to the second client device.

Furthermore, in this specification, the response indicative of the denial is transmitted when the control information has a value by which the execution of the specific operation in the selected current object is not permitted. The response indicative of the permission is transmitted when the control information has a value by which the execution of the specific operation in the selected current object is permitted.

In this specification, the method further includes receiving an object action control point (OACP) information including an Op code instructing the lock of the selected current object from the first client device.

Furthermore, a method for performing communication using Bluetooth in a wireless communication system includes sending an advertising message informing a provision of an object transfer service to a first client device, receiving a scan request message for requesting additional information to the first client device, transmitting a scan response message to the first client device in response to the scan request, receiving a connection request message for Bluetooth connection from the first client device, receiving an object action control point (OACP) information including an Op code indicative of a creation of a new object from the first client device, and creating the new object based on the received OACP information.

Furthermore, in this specification, the OACP information includes at least one of pieces of information about the type, size or password of the new object.

In this specification, the method further includes receiving information about an object owner of the new object from the first client device.

In this specification, the method further includes receiving an object list filter information which indicates only objects belonging to an object list and corresponding to a specific object owner value so that only the objects are displayed from the first client device.

In this specification, the method further includes transmitting an advertising message informing a provision of an object transfer service to a second client device, receiving a connection request message for Bluetooth connection from the second client device, and selecting the new object as a current object. Selecting the new object as the current object includes receiving an object list control point (OLCP) information including Op code instructing movement to the new object from the second client device.

In this specification, the method further includes receiving a write request message for requesting to set the password of the new object to a specific value from the second client device and comparing a password previously set for the new object with the specific value requested by the second client device.

In this specification, the method further includes sending an error message indicative of the denial of the write request message to the second client device if, as a result of the comparison, it is found that the previously stored password is different from the specific value.

In this specification, the method further includes an OK message indicative of the permission of the write request message to the second client device if, as a result of the comparison, it is found that the previously stored password is identical with the specific value.

Furthermore, a server device performing communication using Bluetooth in a wireless communication system includes a communication unit configured to perform communication with an outside in a wireless or wired manner and a processor operatively coupled to the communication unit. The processor performs control so that an advertising message informing a provision of an object transfer service is transmitted to a first client device, a scan request message for requesting additional information is received from the first client device, a scan response message is transmitted to the first client device in response to the scan request, a connection request message for Bluetooth connection is received from the first client device, a specific object is selected as a current object, and a control information indicating whether the execution of a specific operation in the selected current object is permitted is received from the first client device.

Advantageous Effects

In this specification, bulk data, such as a file, can be efficiently transmitted in a smart phone and various devices because an object transfer service is provided in the BLE technology.

Furthermore, this specification has an advantage in that a calculation process for searching for, by a client device, a created or changed object (or data) because a server device immediately notifies the client device of the created or changed object when the object is created or changed in the server device.

Furthermore, this specification has advantages in that a load of a server and a client device can be reduced and power consumption of the device can be reduced because a calculation process for searching for, by a client device, a created or changed object is reduced.

Furthermore, this specification has an advantage in that an object transfer service can be safely performed between a server device and a client device because a security function related to a specific object is provided in an object transfer service.

DESCRIPTION OF DRAWINGS

FIG. 1 is a schematic diagram showing an example of a wireless communication system using a BLE technology proposed in this specification.

FIG. 2 shows an example of the internal configurations of a server device and a client device, which is proposed in this specification.

FIG. 3 shows an example of a BLE topology.

FIG. 4 shows an example of BLE architecture proposed in this specification.

FIG. 5 is a diagram showing an example of a method for providing an object transfer service in the BLE technology.

FIG. 6 shows an example of a method for transmitting data changed indication information in the BLE technology proposed in this specification.

FIG. 7 shows another example of a method for transmitting data changed indication information in the BLE technology proposed in this specification.

FIG. 8 shows yet another example of a method for transmitting data changed indication information in the BLE technology proposed in this specification.

FIG. 9 shows an example of a method for transmitting data changed indication information when a new firmware image is created in the BLE technology proposed in this specification.

FIG. 10 shows another example of a method for transmitting data changed indication information when a new firmware image is created in the BLE technology proposed in this specification.

FIG. 11 shows an example of a method for transmitting data changed indication information using information about an event creation time when a new firmware image is created in the BLE technology proposed in this specification.

FIG. 12 is a diagram showing an example of a method for changing an object and searching for a changed object using an object list control point (OLCP) in the BLE technology proposed in this specification.

FIG. 13 is a diagram showing another example of a method for changing an object and searching for a changed object using an action control point (OACP) in the BLE technology proposed in this specification.

FIGS. 14a to 19 are flowcharts illustrating examples of a method for performing an object transfer service, which are proposed in this specification.

MODE FOR INVENTION

In what follows, the present invention will be described in more detail with reference to appended drawings.

A suffix such as "module" and "unit" introduced in the description below is assigned merely to facilitate description of this document, and the "module" and "unit" can be used interchangeably.

A device described in this specification is a device capable of wireless communication, and may include handheld phones including smart phones, tablet PCs, desktop computers, notebooks, television including TV and IPTV, and sensor types (e.g., an activity sensor, a temperature sensor, and a blood pressure sensor).

In what follows, embodiments of the present invention will be described in detail with reference to appended drawings and descriptions contained in the drawings, but the technical scope of the present invention is not restricted by the embodiments or limited to the embodiments.

Wherever possible, general terms widely used by the public have been chosen as long as the terms do not obscure their technical functions intended in the present invention; however, those terms can be changed by the intention of those skilled in the art, practices, or advent of a new technology.

In some case, specific terms are chosen arbitrarily; in that case, specific meaning of the corresponding terms will be elaborated at the corresponding description.

Therefore, the terms used in this document should be interpreted on the basis of their actual meaning and the description throughout the document rather than the immediate names of the terms.

FIG. 1 is a schematic diagram showing an example of a wireless communication system using a BLE technology proposed in this specification.

The wireless communication system 100 includes at least one server device 110 and at least one client device 120.

The server device and the client device perform Bluetooth communication using a Bluetooth low energy (hereinafter referred to as "BLE") technology.

Compared to the Bluetooth basic rate/enhanced data rate (BR/EDR) technology, the BLE technology has a relatively small duty cycle and enables low price production, and may operate for one year or more if a coin cell battery is used because power consumption can be significantly reduced through a low-speed data transfer rate.

Furthermore, in the BLE technology, a connection procedure between devices has been simplified, and a packet size has been designed to be smaller than that in the Bluetooth BR/EDR technology.

In the BLE technology, (1) the number of RF channels is 40, (2) a data transfer rate is 1 Mbps, (3) a topology is a start structure, (4) latency is 3 ms, (5) a maximum current is 15 mA or less, (6) output power is 10 mW (10 dBm) or less, and (7) the BLE technology is chiefly used in applications, such as mobile phones, watches, sports, health-care, sensors, and device control.

The server device 110 may operate as a client device in the relationship with other devices. The client device may operate as a server device in the relationship with other devices. That is, in the BLE communication system, any one device may operate as a server device or a client device and may also operate as both a server device and a client device, if necessary.

The server device 110 may be represented as a data server device, a master device, or a server, and the client device may be represented as a slave device or a client.

The server device and the client device correspond to major elements of the wireless communication system. The wireless communication system may include other elements in addition to the server device and the client device.

The server device refers to a device which receives data from the client device, directly performs communication with the client device, and provides data to the client device through a response when it receives a data request from the client device.

Furthermore, the server device sends a notification message or an indication message to the client device in order to provide data (or information) to the client device. Furthermore, when the server device sends an indication message to the client device, it receives a confirm message, corresponding to the indication message, from the client device.

Furthermore, the server device may provide data (or information) to a user through a display unit or receive a request from a user through a user input interface in the process for transmitting and receiving the notification, indication, and confirm messages to and from the client device.

Furthermore, the server device may read data from a memory unit and write new data into a corresponding memory unit in the process for transmitting (or sending) and receiving message to and from the client device.

Furthermore, one server device may be connected to a plurality of client devices and may be connected (or coupled) to the client devices again using bonding information.

The client device 120 refers to a device which requests data (or information) and data transmission from the server device.

The client device receives data from the server device through a notification message or an indication message and sends a confirm message as a response to an indication message when it receives the indication message from the server device.

Likewise, the client device may provide information to a user through a display unit or receive an input from a user through a user input interface in the process for transmitting and receiving messages to and from the server device.

Furthermore, the client device may read data from a memory unit or write new data into a corresponding memory unit in the process for transmitting and receiving messages to and from the server device.

Hardware elements, such as the display units, user input interfaces, and memory units of the server device and the client device, are described in more detail with reference to FIG. 2.

Furthermore, the wireless communication system may configure personal area networking (PAN) through a Bluetooth technology. For example, in the wireless communication system, files, documents, etc. can be exchanged rapidly and safely because a private piconet is established between devices.

A BLE device may operate to support various Bluetooth-related protocol, profiles, processing, etc.

FIG. 2 shows an example of the internal configurations of the server device and the client device, which is proposed in this specification.

As shown in FIG. 2, the server device includes a display unit 111, a user input interface 112, a power supply unit 113, a processor 114, a memory unit 115, a Bluetooth interface 116, another interface 117, and a communication unit 118 (or a transmission/reception unit).

The display unit 111, the user input interface 112, the power supply unit 113, the processor 114, the memory unit 115, the Bluetooth interface 116, another interface 117, and the communication unit 118 are operatively connected in order to perform a method proposed in this specification.

Furthermore, the client device includes a display unit 121, a user input interface 122, a power supply unit 123, a processor 124, a memory unit 125, a Bluetooth interface 126, and a communication unit 127 (or a transmission/reception unit).

The display unit 121, the user input interface 122, the power supply unit 123, the processor 124, the memory unit 125, the Bluetooth interface 126, and the communication unit 127 are operatively connected in order to perform a method proposed in this specification.

The Bluetooth interface 116, 126 refers to a unit (or a module) capable of the transmission of request/response, command, notification, and indication/confirm messages or data between devices using a Bluetooth technology.

The memory unit 115, 125 refers to a unit which is implemented in various types of devices and in which various types of data are stored.

The processor 114 or 124 refers to a module for controlling an overall operation of the server device or the client device, and performs control so that messages whose transmission has been requested or which have been received are processed through the Bluetooth interface and another interface.

The processor 114, 124 may be represented as a control part, a control unit, or a controller.

The processor 114, 124 may include application-specific integrated circuits (ASICs), other chipsets, logic circuits and/or data processing units.

The processor 114, 124 controls the communication unit so that it receives an advertising message, including information related to an object transfer service, from the server device, sends a scan request message to the server device, controls the communication unit so that it receives a scan response message from the server device as a response to the scan request, controls the communication unit so that it sends a connect request message to the server device in order to establish a Bluetooth communication connection with the server device, and controls the communication unit so that it receives object identification indication information, including object identification information indicative of a changed object, from the server device.

Furthermore, the processor 114, 124 controls the communication unit so that it receives object filter information, including an object list of only objects marked by a marking type indicative of object characteristics, from the server device.

Furthermore, the processor 114, 124 controls the communication unit so that it sends operation code (Op code) information indicative of a change of a marked object value of an object list to the server device.

Furthermore, the processor 114, 124 controls the communication unit so that it sends object list control point (OLCP) information, including Op code information indicative of a movement to an object having a specific object ID of the object list, to the server device.

The memory unit 115, 125 may include read-only memory (ROM), random access memory (RAM), a flash memory unit, a memory unit card, a storage medium and/or other storage devices.

The communication unit 118, 127 may include a baseband circuit for processing radio signals. When an embodiment is implemented in software, the aforementioned scheme may be implemented into a module (or a process or function) for performing the aforementioned function. The module may be stored in the memory unit and executed by the processor.

The memory unit 115, 125 may be placed inside or outside the processor 114, 124 and may be connected to the processor 114, 124 by various well-known means.

The display unit 111, 121 refers to a module for providing state information about a device and message exchange information to a user through a screen.

The power supply unit 113, 123 refers to a module for being supplied with external power and internal power and for supplying power for the operations of each element under the control of the processor.

As described above, the BLE technology has a small duty cycle and can significantly reduce power consumption through a low-speed data transfer rate. Accordingly, the power supply unit can supply power for the operation of each element with low output power (e.g., 10 mW (10 dBm) or lower).

The user input interface 112, 122 refers to a module for enabling a user to control the operation of the device by providing the processor with a user input, such as a screen button.

FIG. 3 illustrates one example of a Bluetooth low energy network topology.

With reference to FIG. 3, a device A corresponds to a piconet (piconet A, the shaded area) master having a device B and a device C as slaves.

At this time, a piconet refers to a set of devices where one from among a plurality of devices acts as a master and the others occupy a shared physical channel connected to the master device.

A BLE slave does not share the common physical channel with the master. Each slave communicates with the master through a separate physical channel. There is another piconet (piconet F) which consists of a master device F and a slave device G.

A device K belongs to a scatternet K. At this time, a scatternet refers to a group of piconets interconnected to each other.

A device K is a master of a device L and at the same time, a slave of a device M.

A device O also belongs to a scatternet O. The device O is a slave of a device P and at the same time, a slave of a device Q.

FIG. 3 illustrates a case where five different device groups are formed.

A device D is an advertiser, and a device A is an initiator (group D).

A device E is a scanner, and a device C is an advertiser (group C).

A device H is an advertiser, and a device I and a device J are scanners (group H).

The device K is also an advertiser, and a device N is an initiator (group K).

A device R is an advertiser, and the device O is an initiator (group R).

The device A and the device B use one BLE piconet physical channel.

The device A and the device C use another BLE piconet physical channel.

In group D, the device D advertises by using an advertisement event which can be connected on an advertising physical channel, and the device A is an initiator. The device A can establish a connection to the device D and add a device to the piconet A.

In group C, the device C advertises on an advertising physical channel by using a certain type of an advertisement event captured by the scanner device E.

The group D and the group C can utilize different advertising physical channels or different time frames to avoid collision.

The piconet F has one physical channel. The device F and the device G use one BLE piconet physical channel. The device F is a master, and the device G is a slave.

The group H has one physical channel. The device H, I, and J use one BLE advertising physical channel. The device H is an advertiser, and the device I and J are scanners.

In the scatternet K, the device K and L use one BLE piconet physical channel. The device K and M use another BLE piconet physical channel.

In group K, the device K advertises by using an advertisement event which can be connected to an advertising physical channel, and the device N is an initiator. The device N can establish a connection with the device K. At this time, the device K acts as a slave of two devices, and at the same time, a master of one device.

In the scatternet O, the device O and P use one BLE piconet physical channel. The device O and Q use another BLE piconet physical channel.

In group R, the device R advertises by using an advertisement event which can be connected to an advertising physical channel, and the device O is an initiator. The device O can establish a connection with the device R. At this time, the device O acts as a slave of two devices, and at the same time, a master of one device.

FIG. 4 is a view illustrating an example of a Bluetooth low power energy architecture, to which methods proposed in this disclosure is applicable.

As shown in FIG. 4, the BLE structure includes a controller stack that may operate to process a wireless device interface in which timing is important and a host stack that may operate to process high level data.

The controller stack may be called a controller, but in order to avoid being confused with the processor which is an internal element of a device described earlier in FIG. 2, the name of the controller stack is preferred in what follows.

First, the controller stack can be implemented by using a communication module which can include a Bluetooth wireless device and a processor module which can include a processing device such as a microprocessor.

The host stack can be implemented as part of the OS operating on the processor module or as a package instance on the OS.

In some cases, the controller stack and the host stack can be operated or carried out on the same processing device within the processor module.

The host stack comprises Generic Access Profile (GAP) 410, GATT based Profiles 420, Generic Attribute Profile (GATT) 430, Attribute Protocol (ATT) 440, Security Manager (SM) 450, and Logical Link Control and Adaptation Protocol (L2CAP) 460. The host stack is not limited to the aforementioned composition, but can include various protocols and profiles.

By using the L2CAP, the host stack multiplexes various protocols and profiles that Bluetooth specification provides.

First, the L2CAP 460 provides one bilateral channel for transmitting data to according to a specific protocol or with a specific profile.

The L2CAP is capable of multiplexing data among upper layer protocols, segmenting or reassembling packages, and managing multicast data transmission.

BLE uses three fixed channels: one for signaling, another for the security manager, and the third for the attribute protocol.

On the other hand, BR/EDR (Basic Rate/Enhanced Data Rate) uses a dynamic channel and supports protocol service multiplexer, retransmission, streaming mode.

The Security Manager (SM) 450 authenticates a device, which is a protocol for providing key distribution.

The Attribute Protocol (ATT) 440 relies on a server-client structure, which defines rules for the corresponding device to access data. Six message types are defined: Request, Response, Command, Notification, Indication, and Confirmation.

① Request and Response message: Request message is used when a client device requests specific information from a server device, and Response message is used in response to the Request message, which is transmitted from the server device to the client device.

② Command message: It is transmitted from the client device to the server device to indicate a command for specific operation, but the server device does not transmit a response to the Command message to the client device.

③ Notification message: The server device transmits this message to the client device to notify of an event, but the client device does not transmit a confirmation message with respect to the Notification message to the server.

④ Indication and Confirm message: the server device transmits this message to the client device to notify of an event. Different from the Notification message, the client device transmits a Confirm message with respect to the Indication message to the server device.

The Generic Access Profile (GAP) is the layer newly implemented to support BLE technology and is used to control selection of roles for communication among BLE devices and the procedure of multi-profile operation.

The GAP is used mainly for device discovery, connection establishment, and security; defines a method for providing information to a user; and defines the following attribute types.

① Service: a combination of behaviors related to data. Defines basic operation of a device.

② Include: defines a relationship between services.

③ Characteristics: a data value used by a service

④ Behavior: a format that can be readable by a computer, which is defined by Universal Unique Identifier (UUID) and a value type.

GATT-based profiles are dependent on the GATT and are applied mainly for BLE devices. The GATT-based profiles may include Battery, Time, FindMe, Proximity, Object Delivery Service, and so on. More specific descriptions of the GATT-based profiles are as follows.

Battery: method for exchanging battery information.

Time: method for exchanging time information.

FindMe: provides an alarm service according to a distance.

Proximity: method for exchanging battery information.

The GATT can be used as a protocol by which to describe how ATT is utilized at the time of composing services. For example, the GATT can be used to define how ATT profiles are grouped together with services and to describe characteristics associated with the services.

Therefore, GATT and ATT describe device states and services; and how features are associated with each other and how they are used.

The controller stack comprises a physical layer 490, link layer 480, and host controller interface 470.

The physical layer (wireless transmission and reception module 490) transmits and receives a radio signal of 2.4 GHz; and uses Gaussian Frequency Shift Keying (GFSK) modulation and frequency hopping utilizing 40 RF channels.

The link layer 480 transmits or receives Bluetooth packets.

Also, the link layer establishes a connection between devices after performing the advertising and scanning function by using three advertising channels; and provides a function of exchanging a maximum of 42 bytes of data packets through 37 data channels.

The Host Controller Interface (HCI) provides an interface between the host stack and the controller stack so that the host stack can provides commands and data to the controller stack and the controller stack can provide events and data to the host stack.

In what follows, the procedure of Bluetooth Low Energy (BLE) will be described briefly.

The BLE procedure comprises a device filtering procedure, advertising procedure, scanning procedure, discovering procedure, and connecting procedure.

Device Filtering Procedure

The device filtering procedure is intended to reduce the number of devices performing a response to a request, command, or notification in the controller stack.

It is not necessarily required for all of the devices to respond to a received request; therefore, the controller stack reduces the number of transmitted requests so that power consumption can be reduced in the BLE controller stack.

An advertising device or a scanning device can perform the device filtering procedure to restrict devices which receive advertisement packets, scan request, or connection request.

At this time, an advertising device refers to a device which transmits an advertisement event, namely a device which performs advertisement and is also called an advertiser.

A scanning device refers to a device which performs scanning, namely a device which transmits a scan request.

In the BLE specification, if a scanning device receives part of advertisement packets from an advertising device, the scanning device has to transmit a scan request to the advertising device.

However, in case transmission of a scan request is not required as the device filtering procedure is employed, the scanning device can ignore advertisement packets transmitted from an advertising device.

The device filtering procedure can be used even in the connection request procedure. If device filtering is used for the connection request procedure, the need for transmitting a response to a connection request can be made unnecessary by ignoring the connection request.

Advertising Procedure

An advertising device performs an advertisement procedure to perform non-directional broadcast by using the devices within the range of the advertising device.

At this time, non-directional broadcast refers to the broadcast in all directions rather than the broadcast in specific directions.

Different from the non-directional broadcast, directional broadcast refers to the broadcast in a specific direction. Non-directional broadcast is performed without involving a connection procedure between devices in a listening state (in what follows, they are called listening deives).

The advertising procedure is used to establish a Bluetooth connection to a nearby initiating device.

Or the advertising procedure can be used to provide periodic broadcast of user data to the scanning devices performing listening through an advertising channel.

In the advertising procedure, all of the advertisement (or advertisement events) are broadcast through an advertising physical channel.

Advertising devices can receive scan requests from listening devices performing the listening operation to obtain additional user data from advertising devices. An advertising device transmits a response with respect to the scan request to the device which has transmitted the scan request through the same advertising physical channel through which the advertising device has received the scan request.

While the broadcast user data sent as part of advertising packets form dynamic data, the scan response data are static for the most part.

An advertising device can receive a connection request from an initiating device on the advertising (broadcast) physical channel. If the advertising device has used a connectable advertisement event and the initiating device has not been filtered by the filtering procedure, the advertising device stops advertisement and enters a connected mode. The advertising device can resume advertisement after entering the connected mode.

Scanning Procedure

A device performing scan operation, namely a scanning device performs a scanning procedure to listen to non-directional broadcast of user data from advertising devices which use an advertising physical channel.

To request additional user data, the scanning device transmits a scan request to an advertising device through the advertising physical channel. The advertising device transmits a scan response with respect to the scan request through the advertising physical channel by including additional user data that the scanning device has requested.

The scanning procedure can be used while the scanning device is being connected to another BLE device in a BLE piconet.

If the scanning device receives a broadcast advertising event and stays in an initiator mode where a connection request can be initiated, the scanning device can initiate a Bluetooth connection to an advertising device by transmitting a connection request to the advertising device through the advertising physical channel.

If the scanning device transmits a connection request to the advertising device, the scanning device stops all the scanning for additional broadcast and enters the connected mode.

Discovering Procedure

Devices capable of Bluetooth communication (in what follows, they are called 'Bluetooth devices') perform the advertising procedure and the scanning procedure to discover devices in the surroundings of the devices or to be discovered by other devices within a given area.

The discovering procedure is performed in an asymmetric manner. A Bluetooth device searching for another Bluetooth device in the surroundings is called a discovering device and performs listening to search for devices advertising an advertisement event that can be scanned. A Bluetooth device that can be found and used by another device is called a discoverable device, and the discoverable device actively broadcasts an advertisement event so that other devices can scan the discoverable device through an advertising (broadcast) physical channel.

Both of the discovering device and the discoverable device may be already connected to other Bluetooth devices in a piconet.

Connecting Procedure

The connecting procedure is asymmetric. In the connecting procedure, while a particular Bluetooth device is performing the advertising procedure, other Bluetooth devices are required to perform the scanning procedure.

In other words, the advertising procedure can be a primary task to be performed, and as a result, only one device will respond to the advertisement. After receiving a connectable advertisement event from an advertising device, the connecting procedure can be initiated by transmitting a connection request to the advertising device through the advertising (broadcast) physical channel.

Next, operation states defined in the BLE technology, namely advertising state, scanning state, initiating state, and connection state will be described briefly.

Advertising State

The link layer (LL) enters the advertising state by the command of the host (stack). In case the link layer is in the advertising state, the link layer transmits advertising Packet Data Units (PDUs) from advertisement events.

Each advertisement event comprises at least one advertising PDU, and advertising PDUs are transmitted through advertising channel indices used. Each advertisement event can be closed earlier in case advertising PDUs are transmitted through the respective advertising channel indices, the advertising PDUs are terminated, or the advertising device needs to secure space to perform other functions.

Scanning State

The link layer enters the scanning state by the command of the host (stack). In the scanning state, the link layer listens to advertising channel indices.

The scanning state supports two types: passive and active scanning. The host determines scanning type.

No separate time or advertising channel index is defined to perform scanning.

While in the scanning state, the link layer listens to the advertising channel index for the duration of scanWindow. A scanInterval is defined as an interval between start points of two consecutive scan windows.

When there is no scheduling collision, the link layer has to perform listening to complete all of the scanIntervals of scanWindows as commanded by the host. In each scanWindow, the link layer has to scan other advertising channel indices. The link layer uses all of the advertising channel indices available.

In the case of passive scanning, the link layer is unable to transmit any packet but only receives packets.

In the case of active scanning, the link layer performs listening to the advertising device to rely on the advertising PDU type by which additional information related to the advertising PDUs and advertising device can be requested.

Initiating State

The link layer enters the initiating state by the command of the host (stack).

While in the initiating state, the link layer performs listening to the advertising channel indices.

While in the initiating state, the link layer listens to the advertising channel index for the duration of scanWindow.

Connection State

The link layer enters the connection state when a device performing a connection request, namely the initiating device transmits the CONNECT_REQ PDU to an advertising device or the advertising device receives the CONNECT_REQ PDU from the initiating device.

Establishing a connection is taken into account after the link layer enters the connection state. However, there is no need to take into account establishing a connection at the time the link layer enters the connection state. The only difference between a newly created connection and a pre-existing connection is a supervision timeout value for link layer connection.

When two devices are connected to each other, the two devices perform the respective roles different from each other.

The link layer performing the role of the master is called a master, while the link layer performing the role of the slave is called a slave. The master adjusts the timing of a connection event, where the connection event denotes the time at which the mast and the slave are synchronized with each other.

A master (central) is such a device that periodically scans a connectable advertising signal to establish a connection to other device (slave, peripheral) and requests an appropriate device to establish a connection.

Also, once connected to a slave device, the master device sets up timing and supervises periodic data exchange.

At this time, the timing can be a hopping rule applied to two device to exchange data each time through the same channel.

A slave (peripheral) is such a device that periodically transmits a connectable advertising signal to establish a connection with other device (master).

Therefore, if a master device which has received the connectable advertising signal sends a connection request, the slave device accepts the request and establishes a connection with the master device.

After the slave device establishes a connection with the master device, the slave device exchanges data periodically by hopping a channel according to the timing specified by the master device.

In what follows, the packet defined in the Bluetooth interface will be described briefly. BLE devices use the packets described below.

Packet Format

The link layer has only one packet format used for both of the advertising channel packet and data channel packet.

Each packet comprises four fields: a preamble, access address, PDU, and CRC.

When one packet is transmitted from the advertising physical channel, the PDU will function as an advertising channel PDU; when one packet is transmitted from the data physical channel, the PDU will function as a data channel PDU.

Advertising Channel PDU

The advertising channel PDU comprises a 16 bit header and a payload of various size.

The PDU type filed of the advertising channel included in the header supports PDU types as defined in Table 1 below.

TABLE 1

| PDU Type | Packet Name |
| --- | --- |
| 0000 | ADV-IND |
| 0001 | ADV_DIRECT_IND |
| 0010 | ADV_NONCONN_IND |

TABLE 1-continued

| PDU Type | Packet Name |
| --- | --- |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are called advertising PDUs and are used for specific events.

ADV_IND: connectable non-directional advertisement event

ADV_DIREC_IND: connectable directional advertisement event

ADV_NONCONN_IND: non-connectable non-directional advertisement event

ADV_SCAN_IND: non-directional advertisement event that can be scanned

The PDUs are transmitted from the link layer in the advertising state and are received by the link layer in the scanning state or initiating state.

Scanning PDUs

The advertising channel PDU type below is called a scanning PDU and is used in such a state described below.

SCAN_REQ: transmitted by the link layer in the scanning state and received by the link layer in the advertising state.

SCAN_RSP: transmitted by the link layer in the advertising state and received by the link layer in the scanning state.

Initiating PDUs

The advertising channel PDU type below is called an initiating PDU.

CONNECT_REQ: transmitted by the link layer in the initiating state and received by the link layer in the advertising state.

Data Channel PDUs

The data channel PDU comprises a 16 bit header and a payload of various size; and can include a Message Integrity Check (MIC) field.

The procedures, states, and packet formats of the BLE technology descried above can be applied to perform the methods according to the present invention.

FIG. 5 is a diagram showing an example of a method for providing an object transfer service in the BLE technology.

The object delivery service (or object transfer service) refers to a service which is supported in the BLE technology in order to send or receive an object or data, such as bulk data, in Bluetooth communication.

In order to establish a Bluetooth communication connection between the server device 110 and the client device 120, an advertising process and a scanning process corresponding to steps S510~S530 are performed.

First, the server device sends an advertising message to the client device in order to provide notification of server device-related information including an object transfer service (S510). The advertising message may be represented as an advertising packet data unit (PDU), an advertising packet, an advertisement, an advertising frame, or an advertising physical channel PDU.

The advertising message may include service information (including a service name), the name of a server device, and manufacturer data provided by the server device.

Furthermore, the advertising message may be transmitted to the client device in a broadcasting manner or a unicast manner.

Thereafter, the client device sends a scan request message to the server device in order to provide notification of more detailed information related to the server device (S520).

The scan request message may be represented as a scanning PDU, a scan request PDU, a scan request, a scan request frame, or a scan request packet.

Thereafter, the server device sends a scan response message to the client device as a response to the scan request message received from the client device (S530).

The scan response message includes the server device-related information requested by the client device. In this case, the server device-related information may be an object or data which may be transmitted by the server device in relation to the provision of an object transfer service.

When the advertising process and the scanning process are terminated, the server device and the client device performs an initiating connection process and a data exchange process corresponding to steps S540~S570.

In this case, the advertising message is transmitted to the client device again between the advertising and scanning process and the connection initiation process (S635).

That is, the connection request is transmitted from the client device to the server device as a response to the advertising message.

Furthermore, the connection request may be transmitted to the server device only when an ADV_IND message and an ADV_DIRECT_IND message are received.

More specifically, the client device sends a connect request message to the server device in order to establish a Bluetooth communication connection with the server device (S540).

The connect request message may be represented as a connection request PDU, an initiation PDU, a connection request frame, or a connection request.

The Bluetooth communication connection is established between the server device and the client device through step S540. Thereafter, the server device and the client device exchange data. In the data exchange process, the data may be transmitted and received through a data channel PDU.

The client device sends an object data request to the server device through a data channel PDU (S550). The data channel PDU may be represented as a data request message or a data request frame.

Thereafter, the server device sends the object or data, requested by the client device, to the client device through a data channel PDU (S560).

In this case, the object data may be an object itself or object metadata.

If the object data is an object itself, the object data is transmitted to the client device through a new L2CAP channel (within a data channel).

Furthermore, if the object data is object metadata, the object data is transmitted to the client device through an L2CAP channel corresponding to a fixed L2CAP channel ID of the ATT protocol.

In this case, if the object itself is transmitted to the client device, it may be transmitted through the L2CAP.

In this case, the data channel PDU is used to provide data to a counterpart device or to request data (or information) from the counterpart device using a method defined in the Attribute protocol.

Thereafter, when a change of data or an object is generated in the server device, the server device sends data changed indication information to the client device through a data channel PDU in order to provide notification of a change of the data or object (S570).

The client device requests changed object information from the server device in order to search for the changed data or object (S580).

The server device sends the changed object information to the client device in response to the request for the changed object information (S590).

Thereafter, the client device searches for the changed object or data through a comparison and analysis between the received changed object information and the current object information of the client device.

In this case, the client device repeatedly performs steps S580 to S590 until it searches for the changed object or data.

As described above, a detailed method of directly notifying, by the server device, the client device that which data has been changed and a detailed method of directly notifying, by the server device, the client device whether new data has been created or not is not present.

Furthermore, a lot of time and power are wasted because the server device and the client device repeatedly perform steps S580 to S590 until the changed object or data is searched for.

In FIG. 5, an example in which (1) the server device provides notification that an object transfer service is provided and (2) an object or data is changed has been illustrated, but this specification is not limited thereto. This specification may also be likewise applied to an example in which the client device provides notification that an object transfer service is provided and an object or data is changed in the client device.

FIG. 6 shows an example of a method for transmitting data changed indication information in the BLE technology proposed in this specification.

Steps S610 to S660 of FIG. 6 are the same as steps S510 to S560 of FIG. 5, and thus a detailed description thereof is omitted below.

When a new object or data is created in the server device, the server device sends data changed indication information, including (creation) flag information indicating whether an object or data has been created or not, to the client device through a data channel PDU (S670).

Table 2 shows an example of the format of the data changed indication information.

TABLE 2

|  | Flags |
| --- | --- |
| Octet Order | N/A |
| Format type | 8 bit |
| Size | 1 octet |
| Units | Unitless |

Referring to Table 2, the data changed indication information includes a flag field (or information). The flag field has a format type of 8 bits and has a size of 1 octet (or byte).

Table 3 shows an example of the format of the flag field within the data changed indication information.

TABLE 3

| Bit | Definition |
| --- | --- |
| 0 | Who request Change<br>0: Server<br>1: Other Client |
| 1 | Object Changed<br>0: False<br>1: True |
| 2 | Metadata Changed |

TABLE 3-continued

| Bit | Definition |
| --- | --- |
|  | 0: False<br>1: True |
| 3 | Deletion<br>0: False<br>1: True |
| 4 | Creation<br>0: False<br>1: True |
| 5-7 | Reserved for Future Use |

Referring to Table 3, the flag field indicates data changed information.

The 0-th bit value of the flag field is a value indicating that a change of an object has occurred in which device. For example, if the 0-th bit value is "0", it indicates that a change of an object has occurred in the server device. If the 0-th bit value is "1", it indicates that a change of an object has occurred in another client device.

The first bit value of the flag field is a value indicating whether an object itself has been changed. For example, if the first bit value is "0", it indicates that there is no change in an object. If the first bit value is "1", it indicates that an object has been changed.

The second bit value of the flag field is a value indicating whether the metadata of an object has been changed. For example, if the second bit value of the flag field is "0", it indicates that there is no change in the metadata of an object. If the second bit value of the flag field is "1", it indicates that the metadata of an object has been changed.

The third bit value of the flag field is a value indicating whether an object has been deleted. For example, if the third bit value of the flag field is "0", it indicates that an object has not been deleted. If the third bit value of the flag field is "1", it indicates that an object has been deleted.

The fourth bit value of the flag field is a value indicating whether an object has been created or not. For example, if the fourth bit value of the flag field is "0", it indicates that an object has not been created. If the fourth bit value of the flag field is "1", it indicates that an object has been created.

FIG. 7 shows another example of a method for transmitting data changed indication information in the BLE technology proposed in this specification.

Steps S710~S760 of FIG. 7 are the same as steps S510~S560 of FIG. 5, and thus a detailed description thereof is omitted below.

When a change of an object is generated in the server device, the server device sends data changed indication (or object changed indication) information, including object identification information indicative of (or indicating) a changed object, to the client device through a data channel PDU (S770).

In this case, the object identification information may include all means capable of identifying the changed object. The object identification information may be the name of the changed object or the identifier (ID) of the changed object. In this case, the object identification information may include both the name of the changed object and the ID of the changed object.

Table 4 is a format showing an example of the object identification information.

TABLE 4

|  | Changeable | Readability | Who assigns values? | Support Properties |
|---|---|---|---|---|
| Object Name | Yes | Good | System or User | Read, Write |
| Object ID | No | Bad | System | Read |

Referring to Table 4, the object name is changeable, has good readability, has a value allocated by a system or user, and supports both read and write.

In contrast, the object ID is unchangeable, has poor readability, has a value allocated by a system, and supports only read. Furthermore, the object ID is not changed by a person and maintains the same value until it is deleted when a value is allocated by a system (or a server).

The object ID refers to an identifier which is used to identify a specific object, such as an object name. If the object ID is used, a change of an object may be tracked although the object is changed.

Furthermore, the object ID may use a value based on a number or string. For example, a text string of an 8-bit, 16-bit or 32-bit number value or a specific length or more may be used as the object ID.

In general, a number value is used as the object ID. The length of the object ID may be changed depending on system specifications.

Furthermore, the object ID may be used as the auxiliary means of an object name.

Table 5 shows characteristics related to the object identification information.

TABLE 5

| Characteristic | Object Action Control Point | Object List Control Point | Object Filter |
|---|---|---|---|
| Object Name | Read, Write, Append | Order the list by Object Name(ascending or descending) MoveTo Object Name | Name Starts With Name Ends With Name Contains |
| Object ID | Read | Order the list by Object ID(ascending or descending) MoveTo Object ID | Object ID |

Referring to Table 5, the object ID characteristic may be red using the read function of an object action control point (OACP) and may be arranged based on an object ID using an object list control point (OLCP) function.

Furthermore, the object ID characteristic selects an object having a specific object ID as the current object through a MoveTo Object ID function (if the object ID is unique).

In this case, the MoveTo Object ID function may be identically provided as an Object Name.

Furthermore, the object ID characteristic enables only a corresponding object ID to be seen using an object filter function.

Table 6 shows an example of the format of the object ID included in the data changed indication information.

TABLE 6

|  | Flags | Changed Object ID |
|---|---|---|
| Octet Order | N/A | N/A |

TABLE 6-continued

|  | Flags | Changed Object ID |
|---|---|---|
| Format type | 8 bit | String or Integer |
| Size | 1 octet | Variable or Fixed 가능 |

Referring to Table 6, the changed object ID may not use a string, but may use another format (e.g., an integer), and the size of the changed object ID may be variable or fixed.

Table 7 shows an example of the format of the object name included in the data changed indication information.

TABLE 7

|  | Flags | Changed Object Name |
|---|---|---|
| Octet Order | N/A | N/A |
| Format type | 8 bit | String |
| Size | 1 octet | Variable or Fixed 가능 |

Thereafter, the client device sends an object request message to the server device in order to request an object (i.e., a changed object) corresponding to the object identification information (S780).

In this case, the object request message may be represented as an object request or an object request PDU.

Thereafter, the server device sends the data of the changed object or object to the client device (S790).

As described above, FIG. 7 shows an example in which the server device provides notification that an object transfer service is provided and an object is changed. This specification is likewise applied to an example in which the client device provides notification that an object transfer service is provided and an object is changed as in the process of FIG. 7.

That is, the client device performs advertising, sends object identification information indicative of a changed object or data to the server device when the object or data is changed in the client device, and sends the changed object to the server device when the server device requests the changed object corresponding to the object identification information.

FIG. 8 shows yet another example of a method for transmitting data changed indication information in the BLE technology proposed in this specification.

Steps 5810~S860 of FIG. 8 are the same as steps S510~S560 of FIG. 5, and thus a detailed description thereof is omitted below.

When a change of an object or data is generated in the server device, the server device sends data changed indication information, including event generation time information indicative of the time when a change of the object or data is generated, to the client device through a data channel PDU (S870).

The event generation time information may include all of means which may be represented, such as a date (year, month, day), time (hour, minute, second), and may have a variable size depending on means.

Thereafter, the client device searches for the changed object or data based on the received event generation time information (or using the received event generation time information) (S880).

In this case, the client device may search the server device for the changed object or data using various types of time information, such as the last-modified time, a generation time, and the last-access time.

Table 8 shows an example of the data changed indication information format including the event generation time information.

TABLE 8

|  | Flags | Event Time |
|---|---|---|
| Octet Order | N/A | N/A |
| Format type | 8 bit | Time |
| Size | 1 octet |  |

FIG. 9 shows an example of a method for transmitting data changed indication information when a new firmware image is created in the BLE technology proposed in this specification.

In this case, the server device may be a gateway (G/W, the client device may be a sensor, and an object or data provided by an object transfer service may be a firmware image.

FIG. 9 corresponds to the case where a new firmware image is created after a Bluetooth communication connection between the server device and the client device is established.

As shown in FIG. 9, the server device sends an advertising message to the client device in order to notify the client device of the provision of an object transfer service (S910).

Thereafter, the client device sends a connect request message to the server device in order to establish a Bluetooth communication connection (S920).

The Bluetooth communication connection is established between the server device and the client device through step S920.

Thereafter, when a new firmware image (F/W) ("firmware 1.1") is created in the server device (S930), the server device sends data changed indication information, including the created firmware image name ("firmware 1.1"), to the client device (S940).

The data changed indication information indicates information indicating data change, and may be represented by data changed notification information.

In this case, the created new firmware image may be downloaded from the Internet or may be stored by a user.

In this case, the server device may send the data changed indication information to all of client devices connected thereto.

In this case, if the created firmware image name is not transmitted, the client device needs to perform a search task for accessing the server device in order to search for a corresponding file and for checking whether a newly created or changed file is present or not. In this case, a lot of time and power are wasted through the search task.

Furthermore, if an existing firmware image is present and a newly created firmware image corresponds to a higher version of the existing firmware image, the server device may send a changed object or data, including a data change field included in data changed indication information.

Thereafter, the client device checks whether the created firmware image corresponds to its own new firmware image based on the received firmware image name (S950).

If, as a result of the check, it is found that the created firmware image is a new firmware image corresponding to the client device, the client device sends a request for the new firmware image, that is, a newly created object, to the server device (S960).

If, as a result of the check, it is found that the created firmware image is not a firmware image corresponding to the client device or not a new firmware image, the client device does not send a request for the new firmware image to the server device.

Thereafter, the server device sends the newly created firmware image to the client device (S970).

Thereafter, the client device updates an existing firmware image with the new firmware image received from the server device (S970).

FIG. 10 shows another example of a method for transmitting data changed indication information when a new firmware image is created in the BLE technology proposed in this specification.

In this case, the server device may be a gateway (G/W), the client device may be a sensor, and an object or data provided by an object transfer service may be a firmware image.

FIG. 10 corresponds to the case where a new firmware image has been created before a Bluetooth communication connection between the server device and the client device is established.

As shown in FIG. 10, a new firmware image (F/W) ("firmware 1.1") is created in the server device (S1010).

In this case, the new firmware image may be downloaded from the Internet or may be stored by a user.

Thereafter, the server device sends an advertising message to the client device in order to notify the client device of the provision of an object transfer service (S1020). As described above, the advertising message may be represented as an advertising PDU, an advertising channel PDU, an advertisement, or an advertising frame.

Thereafter, the client device sends a connect request message to the server device in order to establish a Bluetooth communication connection (S1030).

The Bluetooth communication connection is established between the server device and the client device through step S1030.

Thereafter, the server device sends data changed indication information, including the created firmware image name ("firmware 1.1"), to the client device (S1040).

The data changed indication information indicates information indicating data change, and may be represented by data changed notification information.

In this case, the server device may send the data changed indication information to all of client devices connected thereto.

In this case, if the created firmware image name is not transmitted, the client device needs to perform a search task for accessing the server device in order to search for a corresponding file and for checking whether a newly created or changed file is present or not. In this case, a lot of time and power are wasted through the search task.

Furthermore, if an existing firmware image is present, the server device may send only a changed object or data, including a data change field included in data changed indication information.

Thereafter, the client device checks whether the created firmware image corresponds to its own new firmware image based on the received new firmware image name (S1050).

If, as a result of the check, it is found that the created firmware image is a new firmware image corresponding to the client device, the client device sends a request for the new firmware image to the server device (S1060).

If, as a result of the check, it is found that the created firmware image is not a firmware image corresponding to the client device or not a new firmware image, the client device does not sends a request for the new firmware image to the server device.

Thereafter, the server device sends the new firmware image, requested by the client device, to the client device (S1070).

Thereafter, the client device updates an existing firmware image with the new firmware image received from the server device (S1080).

For another example, a new firmware image may be created in the client device, and the client device may send the new firmware image to the server device. In this case, transmission and reception operations opposite the transmission and reception operations between the server device and the client device described with reference to FIG. 10 are performed.

FIG. 11 shows an example of a method for transmitting data changed indication information using information about an event creation time when a new firmware image is created in the BLE technology proposed in this specification.

A new firmware image (a firmware image name "firmware 1.1") is generated in the server device (S1110). The time when the firmware image is created is called event generation time information.

In this case, the event generation time information may be all of means which may be represented, such as a date (year, month, day) or time (hour, minute, second), and may have a variable size depending on means.

Thereafter, the server device sends an advertising message to the client device in order to notify the client device of the provision of an object transfer service (S1120). The advertising message may be represented as an advertising PDU, an advertising channel PDU, or an advertisement.

Thereafter, the client device sends a connect request message to the server device in order to establish a Bluetooth communication connection (S1130).

The Bluetooth communication connection is established between the server device and the client device through step S1130.

Thereafter, the server device sends data changed indication information, including the time when a new firmware image is created, that is, event generation time information, to the client device (S1140).

The data changed indication information indicates information indicating data change, and may be represented by data changed notification information.

In this case, the server device may send the data changed indication information to all of client devices connected thereto.

In this case, if the event generation time information is not transmitted, the client device needs to perform a search task for accessing the server device in order to search for a corresponding file and for checking whether a newly created or changed file is present or not. In this case, a lot of time and power are wasted through the search task.

Thereafter, the client device searches for a newly created firmware image using the received event generation time information (S1150).

The client device may search for the firmware image, created in the server device, using various types of time information, such as the last modified time, a creation time, and the last-access time.

Thereafter, the client device checks whether the retrieved new firmware image corresponds to its own new firmware image (S1160).

If, as a result of the check, the retrieved new firmware image corresponds to a new firmware image corresponding to the client device, the client device sends a request for the new firmware image to the server device (S1170).

If, as a result of the check, it is found that the retrieved firmware image is not a new firmware image corresponding to the client device or not a new firmware image, the client device does not send a request for the new firmware image to the server device.

Thereafter, the server device sends the new firmware image, requested by the client device, to the client device (S1180).

Thereafter, the client device updates an existing firmware image with the new firmware image received from the server device (S1190).

A method for transmitting an object list, an object list control point (OLCP) for designating a current object, and an object action control point (OACP), which are proposed in this specification, are described in more detail below.

First, a method for transmitting an object using an object filter, which is proposed in this specification, is described below.

The server device selects a list of specific objects of objects (which perform support, management or services) using object filter information, and shows the selected object list to the client device.

For example, if a filter value of 0x09 has been set in the object filter information, only objects selected based on a marking type are showed in a list form. For detailed contents of the marking type, reference is made to Table 10.

For another example, if a filter value of 0x0A (may be changed to a specific value) has been set in the object filter information, only objects having an object ID value included in the object filter information are showed in a list form.

Table 9 shows an example of the format of the object filter information.

TABLE 9

| Filter Value | Filter Description | Parameter Description | |
|---|---|---|---|
| 0x00 | No Filter(everything passes) | N/A | |
| 0x01 | Name Starts With | String(UTF-8) | |
| 0x02 | Name Ends With | String(UTF-8) | |
| 0x03 | Name Contains | String(UTF-8) | |
| 0x04 | Object Type(UUID) | UUID(gatt_uuid) | |
| 0x05 | Created between(inclusive): timestamp1 <= t <= timestamp2 | LSO timestamp1 | MSO Timestamp2 |
| 0x06 | Modified between(inclusive): timestamp1 <= t <= timestamp2 | LSO timestamp1 | MSO Timestamp2 |
| 0x07 | Accessed between(inclusive): timestamp1 <= t <= timestamp2 | LSO timestamp1 | MSO Timestamp2 |
| 0x08 | Allocated Size between(inclusive): Size1 <= s <= size2 | LSO size1 (UINT32) | MSO size2 (UINT32) |
| 0x09 | Marked Objects | Marking Type(UINT 8) | |
| 0x0A | Object ID | ID Value | |
| 0x0A-0xFF | Reserved for future use | N/A | |

The object filter selects a list of objects to be showed to the client device. Referring to Table 9, "No Filter" shows all objects in a list form without a limit. "Name Starts With" shows only objects, each having an object name that starts from a specific passage, in a list form.

"Name Ends With" shows only objects, each having an object name that ends with a specific passage, in a list form.

"Name Contains With" shows only objects, each having a specific passage as an object name, in a list form.

"Object Type (UUID)" shows only objects, each having an object type of a specific UUID, in a list form.

"Created between (inclusive): timestamp1<=t<=timestamp2" shows only objects, each having a First-Created time between timestamp1 and timestamp2, in a list form.

"Modified between (inclusive): timestamp1<=t<=timestamp2" shows only objects, each having a Last-Modified time between timestamp1 and timestamp2, in a list form.

"Accessed between (inclusive): timestamp1<=t<=timestamp2" shows only objects, each having a Last-Accessed time between timestamp1 and timestamp2, in a list form.

"Allocated Size between (inclusive): size1<=t<=size2" shows only objects, each having a size allocated thereto between size1 and size2, in a list form.

"Marked Objects" shows only objects selected based on a marking type, in a list form.

If an object filter value is indicative of Marked Objects, it shows all marked objects when nothing is selected.

Table 10 shows an example of the format of the marking type. AND or OR operation of a condition is possible through bit operation. If the last bit is "1", the marking type may be AND operation. If the last bit is "0", the marking type may be OR operation.

TABLE 10

| 1st bit | 2nd bit | 3rd bit | 4th bit | 5th bit | 6th bit | 7th bit | 8th bit |
|---|---|---|---|---|---|---|---|
| Object Created | Object Metadata Created | Object Contents Changed | Object Written | Object Appended | Reserved for Future Use | | AND/OR 연산 |

An object list control point (OLCP) for controlling an object list, which is proposed in this specification, is described in more detail below.

The OLCP provides a mechanism by which the client device searches for a preferred object and designates a corresponding object as the current object. Furthermore, the OLCP is used by the client device in order to control a specific action of the server device.

In order to designate the current object, the client device sends OLCP information, including information indicating that a specific object of an object list should be designated as the current object, to the server device.

For example, if a "MoveTo (or GoTo)" field value has been set in OLCP information, it means a movement to an object having a specific object name or specific object ID included in the OLCP information of an object list.

Table 11 shows an example of the format of the OLCP information.

TABLE 11

| Op Code Value | Procedure | Requirement | Parameter | Applicable Response Value | Response Parameter |
|---|---|---|---|---|---|
| 0x00 | | | Reserved for Future Use | | |
| 0x01 | First | M | None | Success, Operation Failed, Too Many Objects, No Object | None |
| 0x02 | Last | M | None | Success, Operation Failed, Too Many Objects, No Object | None |
| 0x03 | Previous | M | None | Success, At First, Operation Failed, Too Many Objects, No Object | None |
| 0x04 | Next | M | None | Success, At Last, Operation Failed, Too Many Objects, No Object | None |
| 0x05 | Skip By | O | Skip Number(SINT48) | Success, Invalid Parameter, At First, At Last, Op Code Not Supported, Operation Failed, Too Many Objects, No Object | None |
| 0x06 | Order | O | List Sort Order(UINT8) | Success, Invalid Parameter, Op Code Not Supported, Operation Failed, Too Many Objects, No Object | None |
| 0x07 | Request Number of Objects | O | None | Success, Op Code Not Supported, Operation Failed, Too Many Objects, No Object | Total Number of Objects(UINT32) |
| 0x08 | MoveTo(GoTo) | | Object Name | Success, Op Code | |

TABLE 11-continued

| Op Code Value | Procedure | Requirement | Parameter | Applicable Response Value | Response Parameter |
|---|---|---|---|---|---|
| | | | or Object ID | Not Supported, Operation Failed, No Object | |
| 0x08-0x6F | | | Reserved for Future Use | | |
| 0x70 | Response Code | M | OLCP Response value | | N/A |

Referring to Table 11, if the Op Code Value field is 0x01, it is the "First" procedure indicating a movement to the foremost of an object list. If the Op Code Value field is 0x02, it is the "Last" procedure indicating a movement to the very last of an object list. If the Op Code Value field is 0x03, it is the "Previous" procedure indicating a movement ahead by one in an object list. If the Op Code Value field is 0x04, it is the "Next" operation indicating a movement to the back by one in an object list. If the Op Code Value field is 0x05, it is the "Skip By" operation indicating a movement ahead (in the case of a negative number) or to the back (in the case of a positive number) by a designated number in an object list. If the Op Code Value field is 0x06, it is the "Order" operation indicating a change of the sequence of an object list to a designated value. If the Op Code Value field is 0x07, it is the "Request Number of Objects" operation indicating the number of objects provided in an object list.

If the Op Code Value field is 0x08, it is the "MoveTo" operation indicating a movement to an object that belongs to an object list and has a specific object name or object ID.

For another example, a "SetMark (or ClearMark)" field value may be included in the OLCP information. The "SetMark (or ClearMark)" field value changes (or deletes) the marked value of an object. For example, if the "SetMark" field value is "True", an object is marked. If the "SetMark" field value is "False", an object is unmarked.

Furthermore, if a "ClearMark" Op Code value is written in the OLCP, Marking Clearing is supported. The server device updates (unmarked) object marking so that all of the objects of an object list are not displayed on the client device that has sent ClearMark Op Code.

In this case, the "SetMark (or ClearMark)" field value may be included in an object operation control point (OACP) and transmitted to the server device.

An OACP for controlling an object operation, which is proposed in this specification, is described in more detail below.

The OACP is used by the client device in order to control a specific operation of the server device.

An OACP process affects only the current object other than a creation process of generating a new object.

The client device sends OACP information, including information indicative of control of the operation of an object, to the server device.

For example, if the "SetMark (or ClearMark)" field value has been set in the OACP information, the marked value of an object is changed. For example, if the "SetMark" field value is "True", an object is marked. If the "SetMark" field value is "False", an object is unmarked.

For example, if the "ClearMark" Op Code value is written in the OLCP, Marking Clearing is supported. The server device updates (unmarked) object marking so that all of the objects of an object list are not displayed on the client device that has sent ClearMark Op Code.

In this case, the "SetMark (or ClearMark)" field value may be included in the OLCP and transmitted to the server device.

Table 12 shows an example of the format of the OACP information.

TABLE 12

| Op Code Value | Procedure | Requirement | Parameter | Applicable Response Value | Response Parameter |
|---|---|---|---|---|---|
| 0x00 | | | Reserved for Future Use | | |
| 0x01 | Create | O | Type(gatt uuid), Size(UINT32) | Op Code Not Supported, Invalid Parameter, Insufficient Resources, Unsupported Type, Operation Failed, Success | None |
| 0x02 | Delete | O | No Parameter | Op Code Not Supported, Operation Failed, Success | None |
| 0x03 | Calculate Checksum | O | Length (UINT32) | Op Code Not Supported, Invalid Parameter, Invalid Object, Operation Failed, Success | None |
| 0x04 | Execute | O | Parameter may be defined by a higher level spec-none otherwise | Op Code Not Supported, Invalid Parameter, Invalid Object, Operation Failed, Success | None |
| 0x05 | Read | O | Length(UINT32) | Op Code Not Supported, Invalid Parameter, Insufficient Resources, Invalid Object, Channel Unavailable, Operation Failed, Success | None |
| 0x06 | Write | O | Length(UINT32) | Op Code Not Supported, Invalid Parameter, Insufficient Resources, Invalid Object, Channel Unavailable, Operation Failed, Success | None |
| 0x07 | Append | O | Length(UINT32) | Op Code Not Supported, Invalid Parameter, Insufficient Resources, Invalid Object, | Total Number of Objects(UINT32) |

TABLE 12-continued

| Op Code Value | Procedure | Requirement | Parameter | Applicable Response Value | Response Parameter |
|---|---|---|---|---|---|
| 0x08 | Seek End | O | No Parameter | Channel Unavailable, Operation Failed, Success Op Code Not Supported, Operation Failed, Invalid Object, Success | |
| 0x09 | SetMark(ClearMark) | O | boolean | Op Code Not Supported, Operation Failed, Invalid Object, Success | N/A |

Referring to Table 12, if the Op Code Value field is 0x01, it is the "Create" operation indicative of the creation of an object. If the Op Code Value field is 0x02, it is the "Delete" operation indicative of the deletion of an object. If the Op Code Value field is 0x03, it is the "Calculate Checksum" operation indicative of checksum calculation. If the Op Code Value field is 0x04, it is the "Execute" operation indicative of the execution of an object. If the Op Code Value field is 0x05, it is the "Read" operation indicative of object data read. If the Op Code Value field is 0x06, it is the "Write" operation indicative of object data write. If the Op Code Value field is 0x07, it is the "Append operation indicative of object data addition write. If the Op Code Value field is 0x08, it is the "SeekEnd" operation indicating that an object matter (e.g., write or read) is executed to the end of an offset. If the Op Code Value field is 0x09, it is the "SetMarking (or ClearMarking)" operation indicative of a change in the marked value of an object.

In this case, a Boolean value is used as the parameter "SetMarking". For example, if the Boolean value is "True", an object is marked. If the Boolean value is "False", an object is unmarked.

When the SetMarking operation is used, a marked object may be set in the client device.

If a changed object is a marked object, the client device unmarks the marked object when checking the corresponding object.

A method for changing an object and a method for searching for a changed object in the BLE technology proposed in this specification are described in more detail below.

FIG. 12 is a diagram showing an example of a method for changing an object and searching for a changed object using an object list control point (OLCP) in the BLE technology proposed in this specification.

The server device 110 sends an advertising message to the client device 120 in order to notify the client device of the provision of an object transfer service (OTS) (S1210). As described above, the advertising message may include service information (including a service name) provided by the server device, the name of the server device, and manufacturer data.

Thereafter, the client device sends a connect request message to the server device in order to establish a Bluetooth communication connection (S1220).

The Bluetooth communication connection is established between the server device and the client device through step S1220.

Thereafter, the server device changes an object or data in response to a server-itself action or a request from the client device (S1230).

Thereafter, the server device sends data changed indication information, including object identification information capable of identifying the changed object or data, to the client device (S1240).

The data changed indication information indicates information indicating data change, and may be represented by data changed notification information.

The object identification information may be the name of the changed object or the ID of the changed object.

In this case, the object identification information is assumed to be "Object Name=1."

The client device may easily search the server device for the changed object using the received data changed indication information in the future.

Thereafter, the client device uses the MoveTo command of an OLCP in order to search for an object indicated by the data changed indication information (or in order to designate an object as the current object). That is, the client device sends OLCP information, including an Op Code Value field indicative of a movement to an object that belongs to an object list and that has "Object Name=1", to the server device so that an object having the "Object Name=1" value is designated as the current object and that the server device designates the current object as an object having the "Object Name=1" value (S1250). For the OLCP information, reference is made to Table 11.

Thereafter, the server device designates the current object as an object having "Object Name=1" based on the received OLCP information (S1260).

In FIG. 12, an example in which the server device performs advertising and an object name is changed has been illustrated. However, the contents described with reference to FIG. 12 may be identically applied to an example in which the client device performs advertising and an object name is changed.

FIG. 13 is a diagram showing another example of a method for changing an object and searching for a changed object using an action control point (OACP) in the BLE technology proposed in this specification.

Referring to FIG. 13, the server device sends an advertising message to the client device in order to notify the client device of the provision of an object transfer service (S1310). The advertising message may include service information (including a service name) provided by the server device, the name of the server device, and manufacturer data.

Thereafter, the client device sends a connect request message to the server device in order to establish a Bluetooth communication connection (S1320).

The Bluetooth communication connection is established between the server device and the client device through step S1320.

Thereafter, the client device sends OACP information, including an Op Code Value field indicative of a change of the name of an object managed by the server device to the name of a new object, to the server device. An example in which the name of an object is changed is described below.

In this case, the Op Code value field may be the "Write" operation." For detailed contents of the OACP, reference is made to Table 12.

Thereafter, the server device changes the name of the object based on the received OACP information, that is, a "Write request" from the client device (S1340).

Thereafter, the server device sends data changed indication information, including object identification information indicating that "Object ID=1" has been newly generated or that an object is a changed object, to the client device (S1350). That is, if the name of an object is changed, the server device notifies the client device that a change of the object has been generated by indicating the changed object through the name of the changed object or the ID of the changed object.

In this case, if a change of the object name is recognized, the server device sends the object identification information indicative of the name of the changed object to all of client devices connected to the server device.

Thereafter, the client device changes an (object) List Filter Characteristics value using the OACP in order to search for an object indicated by the data changed indication information.

That is, the client device sends OACP information, including (Op Code value) information indicative of a change to an (object) List Filter value having Object ID=1, to the server device so that the server device provides only objects each having Object ID=1 (S1360).

Thereafter, the server device provides an object list of the objects each having Object ID=1 (S1370).

Contents related to the security of object transfer in an object delivery service (or an object transfer service) proposed in this specification is described below with reference to FIGS. 14a to 17.

The contents related to the security of object transfer, that is, characteristics, may include an object lock function, an object owner function, an object password setting function, and an object (access) permission function.

The Select Object, Object Read and Write Object functions are first described in brief.

Select Object

Select Object is an example of the object transfer service (OTS) and is used by an object client in order to set a specific object as a current object on an object server.

When the specific object is selected as the current object, information about the specific object may be accessed, and object transfer may be initiated using other procedures.

There are two sub-procedures, that is, (1) selection by object discovery and (2) selection by an object ID in order to select an object.

Select Object by object discovery is used to select an object if an object ID has not yet been known or if OLCP GoTo Object ID Op Code is not supported.

The OLCP GoTo may be represented as OLCP MoveTo.

In contrast, Select Object by object ID may be used if an object ID has been known and may be used to select an object only if OLCP GoTo Object ID Op Code is supported.

Read Object

Read Object is used to read object metadata and object content from an object server.

There are two sub-procedures, that is, (1) an object metadata read procedure and (2) an object content read procedure which may be used to read object data.

The two sub-procedures may be used to copy a current object from an object server to an object client.

The object client needs to read both object content and object metadata related to the object content in order to copy the current object using valid metadata.

Object Metadata Read is used to read the object metadata of a current object from an object server.

The object client reads required object metadata from object metadata characteristics exposed by the object server.

The object client needs to read an object property characteristic in order to check whether the properties of an object permit a required operation.

Object Content Read is used to read some of or the entire content of a current object from an object server.

Object Content Read may be used to copy object content from an object server to an object client.

Object Content Read is used only if an object server supports OACP Read Op Code.

Likewise, in order to perform the object content read procedure, an object client needs to read an object property characteristic in order to check whether the properties of an object permit a required operation.

Write Object

Write Object is used to Write Object metadata and object content in an object on an object server.

Write Object includes two sub-procedures which may be used to Write Object data.

The two sub-procedures include Object Metadata Write and Object Content Write.

Prior to the use of any one of the two sub-procedures, an object client checks whether a related object has been selected as a current object.

If an object server has stored one object only, the one object is previously selected by the object server. If not, a Select Object procedure is performed.

Object metadata characteristic information and object filter information related to the security of object transfer are described below with reference to Table 13 to Table 15.

The object metadata characteristic information refers to a group of characteristics that expose the metadata of a current object.

A value represented by the object metadata characteristic is updated by a server device if the selection of a current object is changed as the results of use of OLCP or OACP.

Table 13 shows an example of an object metadata characteristic information format.

TABLE 13

| Characteristic Name | Requirement | Mandatory Properties | Optional Properties | Security Permissions |
|---|---|---|---|---|
| OTS Feature | M | Read | Indication | Encryption required |
| Object Name | M | Read | Write(C.5) | Encryption required |
| Object Type | M | Read | None | Encryption required |
| Object Allocated Size | M | Read | None | Encryption required |
| Object First-Created | O | Read | Write(C.5) | Encryption required |
| Object Last-Modified | O | Read | Write(C.5) | Encryption required |
| Object Last Accessed | O | Read | None | Encryption required |
| Object Checksum | C.2 | Read | None | Encryption required |
| Object Offset | C.3 | Read, Write | None | Encryption required |
| Object ID | C.4 | Read | None | Encryption required |
| Object Lock | | Read, Write | Indication | Encryption required |
| Object Owner | | Read, Write | Indication | Encryption required |
| the object password | | Read, Write | None | Encryption required |
| object permission | | Read, Write | None | Encryption required |

The meanings of the Object Metadata Characteristics defined in Table 13 may be as follows.

Object Transfer Service (OTS) Feature: a characteristic that defines a function provided by an OTS server.

Object Name: a characteristic indicative of the name of an object.

Object Type: a characteristic indicative of the type or kind of an object.

Object Allocated Size: a characteristic indicative of the size of an object.

Object First-Crated: a characteristic indicative of the time when an object was first created.

Object Last-Modified: a characteristic indicative of the time when an object was finally changed.

Object Last-Accessed: a characteristic indicative of the time when an object was finally accessed.

Object Checksum: a characteristic indicative of the checksum value of an object for checking the integrity of the object.

Octet Offset: a characteristic indicative of the offset value of an object.

Object ID: a characteristic indicative of a unique ID value allocated when an object is created.

Object Lock: a characteristic indicating whether an object may be changed. Object Lock may be changed in a client.

Object Owner: a characteristic indicative of information about a device or user who has the rights to create and manage a specific object.

Object Password: a characteristic indicative of a password for checking the rights (delete, change, etc.) of a specific object.

Object Permission: a characteristic that provides access permission for a specific object.

Object Permission is bit mask information and indicates that it may operate if a corresponding bit is '1'. The '1' value is an example and a corresponding bit may be set as another value. Object Permission may be represented in a bitmap form, and the bit values of the bitmap may have meanings, such as those of Table 14 below.

TABLE 14

| $7^{th}$ bit | $6^{th}$ bit | $5^{th}$ bit | $4^{th}$ bit | $3^{rd}$ bit | $2^{nd}$ bit | $1^{st}$ bit | $0^{th}$ bit |
|---|---|---|---|---|---|---|---|
| RFU | | | | Other Client's Write | Other client's Read | Server's Write | Owner Client's Write |

In Table 14, if the $0^{th}$ bit value of Object Permission is '1', it indicates that an owner client has write rights. If the $1^{st}$ bit value of Object Permission is '1', it indicates that a server has write rights. If the $2^{nd}$ bit value of Object Permission is '1', it indicates that other clients have read rights. If the $3^{rd}$ bit value of Object Permission is '1', it indicates that other clients have write rights.

In this case, if other clients do not have read rights for a specific object, the specific object does not appear in an object list.

Table 15 shows an example of an object filter information format.

TABLE 15

| Filter Value | Filter Description | Parameter Description | |
|---|---|---|---|
| 0x00 | No Filter(everything passes) | N/A | |
| 0x01 | Name Starts With | String(UTF-8) | |
| 0x02 | Name Ends With | String(UTF-8) | |
| 0x03 | Name Contains | String(UTF-8) | |
| 0x04 | Object Type(UUID) | UUID(gatt_uuid) | |
| 0x05 | Created between(inclusive): timestamp1 <= t <= timestamp2 | LSO timestamp1 | MSO Timestamp2 |
| 0x06 | Modified between(inclusive): timestamp1 <= t <= timestamp2 | LSO timestamp1 | MSO Timestamp2 |
| 0x07 | Accessed between(inclusive): timestamp1 <= t <= timestamp2 | LSO timestamp1 | MSO Timestamp2 |
| 0x08 | Allocated Size between(inclusive): Size1 <= s <= size2 | LSO size1 (UINT32) | MSO size2 (UINT32) |
| 0x09 | Marked Objects | Marking Type(UINT 8) | |
| 0x0A | Object ID | ID Value | |
| 0x0B | (Un)locked Object | Lock option(Boolean) | |
| 0x0C | Object Owner | Device Address or Name, User ID, etc. | |
| 0x0C-0xFF | Reserved for future use | N/A | |

In Table 15, for detailed meanings of the filter values '0x00' to '0x0A', reference is made to Table 9.

The meanings of the filter values '0x0B' and '0x0C' are described below.

'0x0B': (un)locked objects—indicate a filter value for searching for objects that have been locked or objects that have not been locked.

The (un)locked objects value may be selected as a 'Boolean' value.

For example, if the (un)locked objects value is set to '0', it may indicate locked objects. If the (un)locked objects value is set to '1', it may indicate unlocked objects.

'0x0C': an object owner—it may indicate the address or name of a device (client or server) which has created a specific object or may indicate information about a device or user who has created a specific object, such as a user ID.

The object owner value may be indicated as a 'string' or 'integer' value. in this specification is described below with reference to FIG. 14.

FIG. 14 is a flowchart illustrating an example of an object transfer service proposed in this specification.

FIG. 14 may be applied to other operations in addition to an operation for updating an F/W image between a server and a client.

Referring to FIG. 14, the server sends an advertising message that provides notification of the provision of an object delivery service (or an object transfer service) to a client 1 (or a sensor 1) (S1401).

An object transfer service using the 'Object Lock' function proposed in this specification is described below with reference to FIGS. 14*a* and 14*b*.

FIGS. 14*a* and 14*b* are flowcharts illustrating an example of an object transfer service proposed in this specification.

FIGS. 14*a* and 14*b* may be applied a server and a client.

Referring to FIGS. 14*a* and 14*b*, the server sends an advertising message that provides notification of the provision of an object delivery service (or an object transfer service) to a client 1 (or a sensor 1) (S1401).

The advertising message may be expressed as an advertising PDU or advertising.

Thereafter, the client 1 sends a connection request message to the server in order to set up Bluetooth connection with the server (S1402).

Thereafter, the client 1 sends information about an object list control point (OLCP) indicative of the movement of an object to 'Object ID=1' to the server in order to designate (its own) current object as an object having an Object ID of '1' (S1403).

Thereafter, the client 1 designates a current object as the object corresponding to 'Object ID=1' (S1404).

Thereafter, the client 1 sends OACP information, including Object Lock indicative of the lock of the object designated at step S1404, that is, the object corresponding to 'Object ID=1', to the server (S1405).

Thereafter, the server sends an advertising message that provides notification of the provision of an object delivery service (or an object transfer service) to a client 2 (or a sensor 2) (S1406).

Thereafter, as in step S1402 to step S1404, the client 2 performs a procedure for (1) transferring a connection request message to the server (S1407), (2) transferring OLCP information for moving its own current object to an object having 'Object ID=1' to the server (S1408), and (3) designating a current object as the object having 'Object ID=1' (S1409).

Thereafter, the client 2 sends OACP information, including Object Delete indicative of the deletion of the object (i.e., the object corresponding to 'Object ID=1') designated at step S1409, to the server (S1410).

Thereafter, the server sends an error message, providing notification that the request to delete the corresponding object has been denied because the object to be deleted has been locked (by the client 1), to the client 2 (S1411).

After step S1401 to step S1411, the client 2 may additionally perform the following process along with the server.

That is, after step S1411, the client 2 sends OACP information, including Object Append that requests the addition of the object designated at step S1409, to the server (S1412).

In this case, Object Append included in the OACP information is a characteristic indicative of an object addition function.

Thereafter, the server sends an error message, providing notification that the request to append the corresponding object has been denied because the object to be appended has been locked, to the client 2 (S1413).

Thereafter, the client 1 sends OACP information that requests the release of the locked object to the server (S1414).

In response to the request, the server releases the lock of the corresponding object.

Thereafter, if the client 2 sends OACP information, including Object Delete that requests the deletion of the object whose lock has been released, to the server (S1415), the server sends a success message that permits the deletion request of the client 2 to the client 2 (because the lock of the corresponding object has been released) (51416).

In this case, Object Delete included in the OACP information is a characteristic indicative of an object deletion function.

An object transfer service using the 'Object Owner' function proposed in this specification is described below with reference to FIG. 15.

FIG. 15 is a flowchart illustrating another example of an object transfer service proposed in this specification.

FIG. 15 may also be applied to other operations in addition to an operation for updating an FAN image between a server and a client.

Steps S1501 and S1502 of FIG. 15 are the same as steps S1401 and S1402 of FIG. 14, and thus a detailed description thereof is omitted.

After step S1502, a client 1 (or a sensor 1) sends OACP information, including Object Create that requests the creation of a specific object, to a server (S1503).

In this case, Object Create included in the OACP information is a characteristic indicative of an object creation function.

The object whose creation was requested may have 'Object Type=1' and a size of 50 bytes.

Furthermore, the client 1 may send the object owner value of the object whose creation was requested, if necessary, along with the OACP information indicating or indicting Object Create.

The object owner value is a value indicative of the address of a device and may be expressed as a string value or integer value.

Thereafter, the server creates an object based on step S1503 (S1504).

In this case, the server may designate the object owner value of the created object as a 'Client 1' or may set the object owner value of the created object based on a value provided as the parameter of Object Create of the OACP information.

Thereafter, the client 1 sends a read request object owner to the server in order to make a read request for the object owner value of the created object (S1505).

Thereafter, the server sends the object owner value, set at step S1504, to the client 1. That is, the server sends a read response to the client 1.

Thereafter, the client 1 sends object list filter information in which 'Object Owner=Client 1' has been set to the server in order to request that the object owner value appears only in objects corresponding to the 'Client 1' from the server.

Thereafter, the server filters an object list so that it includes only object corresponding to 'Object Owner=Client 1'.

An object transfer service using the object password function proposed in this specification is described below with reference to FIGS. 16 and 17.

FIG. 16 is a flowchart illustrating yet another example of an object transfer service proposed in this specification.

FIG. 16 may also be applied to other operations in addition to an operation for updating an F/W image between a server and a client.

Steps S1601 and S1602 of FIG. 16 are the same as steps S1401 and S1402 of FIG. 14, and thus a detailed description thereof is omitted.

After step S1602, a client 1 (or a sensor 1) sends OACP information, including Object Create for requesting the creation of a specific object, to a server (S1603).

In this case, Object Create included in the OACP information is a characteristic indicative of an object creation function.

The object whose creation was requested may have 'Object Type=1', 'Object Size=50 bytes', and 'Object Password=111'.

Thereafter, the server newly creates an object in which an object type is '1', the size of the object is '50 bytes' and the password of the corresponding object is '111' (S1604).

In this case, if the password value of the object whose creation was requested by the client 1 has not been set, the client 1 may subsequently write the password of the corresponding object through a write request.

Furthermore, it is assumed that the object ID of the object whose creation was requested has been set to '1'.

Thereafter, the server sends an advertising message that provides notification of the provision of an object delivery service (or an object transfer service) to a client 2 (or a sensor 2) (S1605).

Thereafter, the client 2 (1) transfers a connection request message to the server (S1606) and (2) sends OLCP information for moving its own current object to the object having 'Object ID=1' (S1607).

Thereafter, the client 2 sends a write request (password=123) to the server in order to request the writing of the value '123' in the password characteristic of the created object (S1608).

Thereafter, the server compares the object password value received from the client 2 with a previously stored password value.

If, as a result of the comparison, it is found that the password values are different, the server denies the writing of the requested password and sends an error (response) message, providing notification that the object password value is wrong, to the client 2 (S1609).

In addition, the client 2 sends OACP information, including Read Object, to the server in order to request the reading of the created object (S1610).

Thereafter, if the password input by the client 2 is not present or the passwords are different, the server returns or sends an error message to the client 2 without performing another action (S1611).

Thereafter, the client 2 sends a write request (password=111) to the server in order to request the writing of the value '111' in the password characteristic of the created object (S1612).

Thereafter, the server sends a positive response (OK) message for the write request (password=111) to the client 2 because it has received an accurate object password value from the client 2 through step S1612 (S1613).

Through such a procedure, the client 2 may use a read function and write function for an object whose password has been confirmed.

FIG. 17 is a flowchart illustrating yet another example of an object transfer service proposed in this specification.

Unlike FIG. 16, FIG. 17 shows a method for also providing an object password when sending an OACP request.

FIG. 17 may also be applied to other operations in addition to an operation for updating an F/W image between a server and a client.

Steps S1701 and S1707 of FIG. 17 are the same as steps S1601 and S1607 of FIG. 16, and thus a detailed description thereof is omitted.

After step S1707, a client 2 sends OACP information, including Object Read in which 'Object Password=123' has been set, to the server in order to request the reading of the object created at step S1704 (S1708).

In this case, the server senses that the password value of the object transmitted by the client 2 is different from the previously stored password value of the corresponding object.

Accordingly, the server denies the OACP information (including the Object Read request) requested by the client 2, and sends an error (response) message, providing notification that the password of the object was wrong, to the client 2 (S1709).

Thereafter, the client 2 sends OACP information, including Object Read in which 'Object Password=111' has been set, to the server in order to request the reading of the created object again (S1710).

In this case, Object Read included in the OACP information is a characteristic indicative of an Object Read function.

Thereafter, the server senses that the password of the object input by the client 2 is identical with the previously stored password of the corresponding object, and performs a function for reading the object requested by the client 2 along with the client 2 (S1711).

In this case, the server may perform the Object Read function along with the client 2 through the L2CAP.

An object transfer service using an object permission function proposed in this specification is described below with reference to FIGS. 18 and 19.

As described above, the object permission function relates to whether the reading or writing of an object is permitted or allowed, and may be expressed as an object property.

FIG. 18 is a flowchart illustrating yet another example of an object transfer service proposed in this specification.

FIG. 18 may also be applied to other operations in addition to an operation for updating an FAN image between a server and a client.

Steps S1801 and S1802 of FIG. 18 are the same as steps S1401 and S1402 of FIG. 14, and thus a detailed description thereof is omitted.

After step S1802, the client 1 (or sensor 1) sends OACP information, including Object Create for requesting the creation of a specific object, to a server (S1803).

In this case, Object Create included in the OACP information is a characteristic indicative of an object creation function.

The object whose creation was requested may be 'Object Type=1' and 'Object Size=50 bytes'.

Thereafter, the server newly creates an object in which an object type is '1' and the size of the object is '50 bytes' (S1804).

In this case, it is assumed that the object ID of the object whose creation was requested has been set to '1'.

Thereafter, the client 1 sends Write Object Permission to the server so that the server and/or other clients can or cannot read and/or write the specific object (e.g., an object corresponding to 'Object ID=1').

The object permission characteristic may have the form of Table 14 described above.

FIG. 18 shows an example in which the client 1 sends Write Object Permission to the server in order to write Object Permission that makes other clients impossible the reading and writing of the created object (S1805).

Thereafter, the server sends an advertising message, providing notification of the provision of an object delivery service (or an object transfer service), to a client 2 (or a sensor 2) (S1806).

Thereafter, the client 2 (1) transfers a connection request message to the server (S1807) and (2) sends OLCP information for moving its own current object to the object having 'Object ID=1' to the server (S1808).

Thereafter, the client 2 sends OACP information including an Object Write request to the server in order to request writing for the created object (S1809).

The writing for the created object may be writing for object metadata or object content.

Thereafter, the server returns or sends an error message that denies the request at step S1809 to the client 2 because writing has been set to be impossible in the permission of the created object (S1810).

Thereafter, the client 2 sends OACP information including an object read request to the server in order to request reading for the created object (S1811).

Thereafter, the server returns or sends an error message that denies the request at step S1811 to the client 2 because reading has been set to be impossible in the permission of the created object (S1812).

FIG. 19 is a flowchart illustrating yet another example of an object transfer service proposed in this specification.

FIG. 19 may also be applied to other operations in addition to an operation for updating an F/W image between a server and a client.

Steps S1901 to S1904 of FIG. 19 are the same as steps S1801 to S1804 of FIG. 18, and thus a detailed description thereof is omitted.

After step 51904, the client 1 sends Write Object Permission to the server so that the server and/or other clients can or cannot read and write a specific object (e.g., an object corresponding to 'Object ID=1').

The object permission characteristic may have the form of Table 14 described above.

FIG. 19 shows an example in which the client 1 sends Write Object Permission to the server in order to write Object Permission that enables other clients to read and/or write the created object (S1905).

Thereafter, the server sends an advertising message, providing notification of the provision of an object delivery service (or an object transfer service), to a client 2 (or sensor 2) (S1906).

Thereafter, the client 2 (1) transfers a connection request message to the server (S1907) and (2) sends OLCP information for moving its own current object to an object having 'Object ID=1' to the server (S1908).

Thereafter, the client 2 sends OACP information including an object write request to the server in order to request writing for the created object (S1909).

Thereafter, the server sends a write response message that permits the request at step S1809 to the client 2 because writing has been set to be possible in the permission of the created object (S1910).

Accordingly, after step S1910, the created object according to the OACP operation is transmitted from the server to the client 2 (S1911).

Furthermore, the drawings have been divided and described for convenience of a description, but a new embodiment may be designed so that it is implemented by merging the embodiments described with reference to the drawings. Furthermore, the range of right of the present invention also includes designing a computer-readable recording medium in which a program for executing the aforementioned embodiments has been written according to the needs of those skilled in the art.

The method for providing an object transfer service according to this specification is not limited and applied to the configurations and methods of the aforemtioned embodiments, but some or all of the embodiments may be selectively combined and configured so that the embodiments are modified in various ways.

Furthermore, the method for providing an object transfer service according to this specification may be implemented in a recording medium, readable by a processor included in a network device, in the form of code readable by a processor. The processor-readable recording medium includes all types of recording devices in which data readable by a processor is stored. The recording medium may include ROM, RAM, CD-ROM, magnetic tapes, floppy disks, and optical data storages, for example. Furthermore, the processor-readable recording medium may be distributed to computer systems connected over a network, and the processor-readable code may be stored and executed in a distributed manner.

Furthermore, although some embodiments of this specification have been illustrated and described above, this specification is not limited to the aforementioned specific embodiments, and a person having ordinary skill in the art to which this specificaiton pertains may modify the present invention in various ways without departing from the gist of the claims. Such modified embodiments should not be individually interpreted from the technological spirit or prospect of this specification.

Furthermore, in this specification, both the device invention and the method invention have been described, but the descriptions of both the inventions may be complementally applied, if necessary.

INDUSTRIAL APPLICABILITY

This specification provides a method for transmitting data or object-related data using Bluetooth communication.

The invention claimed is:
1. A method for performing communication using Bluetooth Object Transfer Service (OTS) in a wireless communication system, the method being performed by a server device and comprising:
transmitting, to a first client device, an advertising message informing a provision of an object transfer service;
receiving, from the first client device, a connection request message for Bluetooth connection;
receiving, from the first client device, an object list control point (OLCP) information including an Op code instructing movement to an object having a specific object identifier;
selecting a specific object in an object list including a plurality of objects as a current object,
wherein the current object includes bulk data and meta data, and
wherein the first client device receives the bulk data and the meta data by reading the current object through a characteristic for the OTS;
transmitting, to the first client device, a control information on whether an execution of a specific operation in the current object is permitted;
receiving, from the first client device, an object action control point (OACP) information including an Op code instructing an execution of a specific operation in the selected current object; and transmitting, to the first client device, data changed information on change of the specific object in the object list when the specific object is changed.

2. The method of claim 1, wherein the execution of the specific operation includes at least one of reading the current object of the server device, or writing data of the other client device in the current object.

3. The method of claim 1, further comprising:

transmitting, to a second client device, an advertising message informing a provision of an object transfer service;

receiving, from the second client device, a connection request message for Bluetooth connection; and receiving, from the second client device, an OLCP information including an Op code instructing movement of an object to the selected current object.

4. The method of claim 1, further comprising:

transmitting, to the first client device, a response related to denial or permission of the received OACP information.

5. The method of claim 4, wherein:

the response related to denial is transmitted when the control information has a value by which the execution of the specific operation in the selected current object is not permitted, and the response related to the permission is transmitted when the control information has a value by which the execution of the specific operation in the selected current object is permitted.

6. The method of claim 1, further comprising receiving an OACP information, from the first client device, including an Op code instructing a lock of the selected current object.

7. A method for performing communication using Bluetooth Object Transfer Service (OTS) in a wireless communication system, the method being performed by a server device and comprising:

transmitting, to a first client device, an advertising message informing a provision of an object transfer service;

receiving, from the first client device, a connection request message for Bluetooth connection;

receiving, from the first client device, an object action control point (OACP) information including an Op code instructing a creation of a new object;

creating the new object based on the received OACP information, wherein the new object includes bulk data and meta data, wherein the first client device receives the bulk data and the meta data by reading the new object through a characteristic for the OTS, and wherein the new object is added to an object list including a plurality of objects; and transmitting, to the first client device, data changed information on change of the specific object in the object list when the specific object is changed.

8. The method of claim 7, wherein the OACP information includes at least one of pieces of information about a type, size or password of the new object.

9. The method of claim 7, further comprising receiving, from the first client device, information about an object owner of the new object.

10. The method of claim 9, further comprising receiving an object list filter information, from the first client device, which is related to only objects belonging to an object list and corresponding to a specific object owner value so that only the objects are displayed.

11. The method of claim 7, further comprising:

transmitting, to a second client device, an advertising message informing a provision of an object transfer service;

receiving, from the second client device, a connection request message for Bluetooth connection; and selecting the new object as a current object, wherein selecting the new object as the current object comprises receiving, from the second client device, an object list control point (OLCP) information including an Op code instructing movement to the new object.

12. The method of claim 11, further comprising:

receiving, from the second client device, a write request message for requesting to set a password of the new object to a specific value; and comparing a password previously set for the new object with the specific value requested by the second client device.

13. The method of claim 12, further comprising transmitting an error message related to a denial of the write request message to the second client device if, as a result of the comparison, it is found that the previously stored password is different from the specific value.

14. The method of claim 12, further comprising an OK message indicative of a permission of the write request message to the second client device if, as a result of the comparison, it is found that the previously stored password is identical with the specific value.

15. A server device performing communication using Bluetooth Object Transfer Service (OTS) in a wireless communication system, the server device comprising:

a communication unit configured to perform communication with another device in a wireless or wired manner; and a processor operatively coupled to the communication unit, wherein the processor is configured to:

transmit, to a first client device, an advertising message informing a provision of an object transfer service;

receive, from the first client device, a connection request message for Bluetooth connection;

receive, from the first client device, an object list control point (OLCP) information including an Op code instructing movement to an object having a specific object identifier;

select a specific object in an object list including a plurality of objects as a current object, wherein the current object includes bulk data and meta data, and wherein the first client device receives the bulk data and the meta data by reading the current object through a characteristic for the OTS;

transmit, to the first client device, a control information on whether an execution of a specific operation in the current object is permitted;

receive, from the first client device, an object action control point (OACP) information including an Op code instructing an execution of a specific operation in the selected current object and transmit, to the first client device, data changed information on change of the specific object in the object list when the specific object is changed.

16. A server device performing communication using Bluetooth Object Transfer Service (OTS) in a wireless communication system, the server device comprising:

a communication unit configured to perform communication with another device in a wireless or wired manner; and a processor operatively coupled to the communication unit, wherein the processor is configured to:

transmit, to a first client device, an advertising message informing a provision of an object transfer service;

receive, from the first client device, a connection request message for Bluetooth connection;

receive, from the first client device, an object action control point (OACP) information including an Op code instructing a creation of a new object;

create the new object based on the received OACP information, wherein the new object includes bulk data and meta data, wherein the first client device receives the bulk data and the meta data by reading the new object through a characteristic for the OTS, and wherein the new object is added to an object list including a plurality of objects; and transmit, to the first client device, data changed information on change of the specific object in the object list when the specific object is changed.

* * * * *